United States Patent
Chen et al.

(10) Patent No.: US 12,129,561 B2
(45) Date of Patent: Oct. 29, 2024

(54) RUTHENIUM AND NITROGEN DOPED CARBON MATRIX CATALYST AND METHODS FOR MAKING AND USING THEREOF

(71) Applicant: The Regents of the University of California, Oakland, CA (US)

(72) Inventors: Shaowei Chen, Santa Cruz, CA (US); Bingzhang Lu, Santa Cruz, CA (US); Lin Guo, Santa Cruz, CA (US); Yi Peng, Santa Cruz, CA (US); Jia-En Lu, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 672 days.

(21) Appl. No.: 17/282,156

(22) PCT Filed: Sep. 27, 2019

(86) PCT No.: PCT/US2019/053387
§ 371 (c)(1),
(2) Date: Apr. 1, 2021

(87) PCT Pub. No.: WO2020/072291
PCT Pub. Date: Apr. 9, 2020

(65) Prior Publication Data
US 2021/0355588 A1    Nov. 18, 2021

Related U.S. Application Data

(60) Provisional application No. 62/740,158, filed on Oct. 2, 2018.

(51) Int. Cl.
C25B 11/091    (2021.01)
C25B 1/04      (2021.01)
C25B 11/052    (2021.01)
C25B 11/061    (2021.01)

(52) U.S. Cl.
CPC .............. *C25B 11/091* (2021.01); *C25B 1/04* (2013.01); *C25B 11/052* (2021.01); *C25B 11/061* (2021.01)

(58) Field of Classification Search
CPC ...................................................... C25B 1/04
See application file for complete search history.

(56) References Cited

PUBLICATIONS

Lu et al ("Nitrogen and Iron-Codoped Carbon Hollow Nanotubules as HighPerformance Catalysts toward Oxygen Reduction Reaction: A Combined Experimental and Theoretical Study", Chem. Mater. 2017, 29, 13, 5617-5628) (Year: 2017).*

Zhang et al ("Single-Atomic Ruthenium Catalytic Sites on Nitrogen-Doped Graphene for Oxygen Reduction Reaction in Acidic Medium", ACS Nano, 2017, 11, 7, 6930-6941). (Year: 2017).*

(Continued)

*Primary Examiner* — Alexander W Keeling
(74) *Attorney, Agent, or Firm* — Carter, DeLuca & Farrell LLP

(57) ABSTRACT

A catalyst nanocomposite and methods of making the same. The catalyst nanocomposite includes a substrate; and a coating disposed on the substrate, the coating having a ruthenium and nitrogen co-doped carbon matrix. The coating may be melamine and formaldehyde and produced via pyrolizing the melamine and formaldehyde on a nanowire made of metals such as tellurium.

19 Claims, 19 Drawing Sheets

(56) References Cited

PUBLICATIONS

Zhang, C. et al. "Single-Atomic Ruthenium Catalytic Sites on Nitrogen-Doped Graphene for Oxygen Reduction Reaction in Acidic Medium" ACS Nano. 2017, 11, 7, 6930-6941; Jun. 28, 2017 <DOI: 10.1021/acsnano.7b02148> abstract; figures 1A and 4A-D; p. 6932, paragraph 2-p. 6933, paragraph 1; p. 6935, paragraph 2-p. 6936, paragraph 2.

Lu, B. et al. "Nitrogen and Iron-Codoped Carbon Hollow Nanotubules as High-Performance Catalysts Toward Oxygen Reduction Reaction: A Combined Experimental and Theoretical Study" Chem. Mater. 2017, 29, 13, 5617-5628; Jun. 8, 2017. <001:10.1021/acs.chemmater.7b01265> abstract.

Lu, B. et al. "Ruthenium Atomically Dispersed in Carbon Outperforms Platinum Toward Hydrogen Evolution in Alkaline Media" Nature Communications. 10,631; Feb. 7, 2019; <DOI:10.1038/s41467-019-08419-3>; entire document.

Chen, L. et al. "Intervalence Charge Transfer of Ruthenium-Nitrogen Moieties Embedded within Nitrogen-Doped Graphene Quantum Dots" J. Phys. Chem. C 2016, 120, 13303-13309; Jun. 2, 2016 <DOI: 10.1021/acs.jpcc.6b04315> abstract.

The International Search Report and Written Opinion dated Dec. 30, 2019 issued in corresponding PCT Appln. No. PCT/US19/53387.

\* cited by examiner

BINDING ENERGY eV

BINDING ENERGY eV

BINDING ENERGY eV

RUTHENIUM AND NITROGEN DOPED CARBON MATRIX CATALYST AND METHODS FOR MAKING AND USING THEREOF

CROSS REFERENCE TO RELATED APPLICATIONS

The present application is a National Stage Application under 35 U.S.C. § 371(a) of PCT/US2019/053387, filed Sep. 27, 2019, which claims the benefit of and priority to U.S. Provisional Patent Application Ser. No. 62/740,158, filed Oct. 2, 2018. The entire disclosures of all of the foregoing applications are incorporated by reference herein.

GOVERNMENT LICENSE RIGHTS

This invention was made with Government support under Grant No. CHE1710408, awarded by the National Science Foundation. The Government has certain rights in the invention.

BACKGROUND

Hydrogen evolution reaction (HER) is an important process in electrochemical energy conversion and storage. HER plays a significant role in electrochemical water splitting for clean and sustainable hydrogen energy. In practice, room-temperature water electrolysis can be performed in both acid and alkaline electrolytes, where platinum-based nanoparticles generally serve as the catalysts of choice. Whereas numerous studies have been carried out in acid, the high costs of proton exchange membranes, as well as the sluggish electron-transfer kinetics of oxygen evolution reaction in acidic media have greatly hampered the wide-spread applications of acidic water electrolyzers. Such issues can be mitigated when the reactions are carried out in alkaline media.

HER may be summarized using Volmer, Heyrovsky, and Tafel reactions:

$$H_2O + {}^* + e^- = H^* + OH^- \text{ (Volmer)} \quad (1)$$

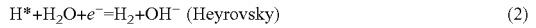

$$H^* + H_2O + e^- = H_2 + OH^- \text{ (Heyrovsky)} \quad (2)$$

$$2H^* = H_2 \text{ (Tafel)} \quad (3)$$

with * being the active site. Whereas alkaline HER entails water dissociation, a unique step that is unseen in acid HER, the adsorption free energy of H to the catalyst surface ($\Delta G_{H^*}$) is an effective descriptor of alkaline HER. The adsorption free energy in conjunction with the calculations of the energy barrier of water dissociation allows for resolving the active sites as well as the reaction pathways of alkaline HER.

However, alkaline water electrolysis also includes certain disadvantages, such as markedly diminished HER electron-transfer kinetics catalyzed by platinum (about two orders of magnitude lower than that in acid). Thus, there is a need to develop viable alternatives to conventional platinum catalysts, which are lower in cost, higher performing, and are better suited for HER electrocatalysis in alkaline electrolytes.

SUMMARY

The present disclosure provides novel and effective catalyst compositions based on ruthenium (Ru) and nitrogen (N) co-doped carbon (C) nanowires. The catalytic performance is markedly better than that of commercial platinum/carbon (Pt/C) catalysts, with an overpotential of only about −12 millivolts (mV) needed to reach the current density of 10 mA/cm$^2$ in 1 molar (M) potassium hydroxide (KOH) and an overpotential of −47 mV in 0.1 M KOH. As used herein, the term "overpotential" denotes a potential difference (voltage) between the potential at which the redox event occurs and a half-reaction's thermodynamically determined reduction potential, and is used as a parameter to quantify the electrocatalytic activity.

The catalyst composition according to the present disclosure is a nanocomposite based on ruthenium and nitrogen co-doped carbons. The nanocomposite includes melamine-formaldehyde polymer coated tellurium nanowires. The core-sheath nanowires are then pyrolyzed at a controlled temperature, with the addition of a calculated amount of ruthenium(III) chloride, leading to the formation of ruthenium, nitrogen co-doped carbon nanowires where both ruthenium nanoparticles and ruthenium single atoms were embedded within the carbon matrix. The catalyst composition exhibited remarkable HER activity in alkaline media, better than that of commercial platinum/carbon catalysts. Control experiments described in the Examples show that the HER activity was primarily due to atomically dispersed Ru coordinated to N and C, with minor contributions from Ru nanoparticles. In particular, the increased catalytic activity of the presently disclosed catalyst composition is due to the individual ruthenium atoms being embedded within a carbon matrix (i.e., nanowires), with minimal contribution from ruthenium nanoparticles. The atomic structure of the catalyst composition was confirmed using high-angle annular dark-field scanning transmission electron microscopy (HAADF-STEM) and X-ray absorption spectroscopic measurements. Results from relevant first principles calculations also illustrate that the RuC$_2$N$_2$ moieties (those of individual ruthenium atoms) are the most active catalytic centers. Taken together, these results suggest that ruthenium single atoms serve as high-performance HER catalysts in alkaline media. Carbon atoms adjacent to the Ru center also acted as active sites based on favorable H binding energies and relatively low formation energies.

According to one embodiment of the present disclosure, a catalyst nanocomposite is disclosed, which includes a substrate; and a coating disposed on the substrate, the coating having a ruthenium and nitrogen co-doped carbon matrix.

According to one aspect of the above embodiment, the substrate is a nanowire having a length from about 100 nm to about 10,000 nm and a cross-sectional diameter from about 10 nm to about 100 nm. The nanowire may be metal including at least one of tellurium, copper, silver, gold, iron, silicon, zinc, germanium, antimony, oxides or alloys thereof. The nanowires serve as sacrificial templates.

According to another aspect of the above embodiment, the coating is a melamine-formaldehyde polymer. The ruthenium is present in the carbon matrix as nanoparticle species and atomic species, at a ratio of the atomic species to the nanoparticle species being from about 0.3 to about 0.5. The ratio of the atomic species to the nanoparticle species may be from about 0.35 to about 0.45.

According to another embodiment of the present disclosure, a method for forming a catalyst nanocomposite is disclosed. The method includes: forming a coating on a substrate; reacting the substrate having the coating with a catalyst metal halide salt to incorporate catalyst metal atoms into the resin; and pyrolizing the substrate having the coating and the catalyst metal atoms to form a catalyst metal atom and nitrogen co-doped carbon matrix.

According to one aspect of the above embodiment, the method further includes forming a plurality of nanowires, each of the nanowires acting as the substrate and having a length from about 100 nm to about 10,000 nm and a cross-section diameter from about 10 nm to about 100 nm. The plurality of nanowires may be formed from a metal including at least one of tellurium, copper, silver, gold, iron, silicon, zinc, germanium, antimony, oxides or alloys thereof. Forming the resin may include polymerizing melamine and formaldehyde to form a melamine-formaldehyde polymer.

According to another aspect of the above embodiment, pyrolizing the substrate having the coating and the catalyst metal salts includes heating the substrate having the coating and the catalyst metals to a temperature from about 500° C. to about 800° C.

According to a further aspect of the above embodiment, the catalyst metal is ruthenium. Ruthenium is present in the carbon matrix as nanoparticle species and atomic species. The ratio of the atomic species to the nanoparticle species is from about 0.3 to about 0.5. Ruthenium may be present at a ratio of the atomic species to the nanoparticle species from about 0.35 to about 0.45.

According to a further embodiment of the present disclosure, a method for producing hydrogen is disclosed. The method includes contacting at least one hydrogen-containing compound to a catalyst composition under conditions suitable for dehydrogenating the at least hydrogen-containing compound to form hydrogen, wherein the catalyst composition includes a substrate having a coating, which includes a ruthenium and nitrogen co-doped carbon matrix. The method may further include electrochemically reducing water at a controlled potential to form hydrogen.

According to one aspect of the above embodiment, the substrate is a nanowire having a length from about 100 nm to about 10,000 nm and a cross-sectional diameter from about 10 nm to about 100 nm and the nanowire is metal including at least one of tellurium, copper, silver, gold, iron, silicon, zinc, germanium, antimony, oxides or alloys thereof.

According to another aspect of the above embodiment, the coating is a melamine-formaldehyde polymer.

According to a further aspect of the above embodiment, ruthenium is present in the carbon matrix as nanoparticle species and atomic species at a ratio of the atomic species to the nanoparticle species from about 0.3 to about 0.5.

BRIEF DESCRIPTION OF DRAWINGS

Various embodiments of the present disclosure will be described herein below with reference to the figures wherein.

DETAILED DESCRIPTION

The present disclosure is directed to a catalyst composition including nanowires having a resin shell, which is co-doped with transition metals and nitrogen. The nanowires may be formed using hydrothermal synthesis of metal salts and/or oxides or any other suitable material. A resin shell is then formed on the nanowires. The transition metal is then incorporated into the resin shell. The nanowires are then subjected to pyrolysis at a temperature from about 500° C. to about 800° C. to form a carbon matrix on the resin shell, the carbon matrix being co-doped with a transition metal and nitrogen. The resin shell acts as a source of carbon and nitrogen for the matrix.

As used herein, the term "nanowire" denotes a nanoscale rod or two-dimensional strip formed from any suitable thermally removable material having a length from about 100 nm to about 10,000 nm and a width or diameter from about 10 nm to about 100 nm.

Figure 1:
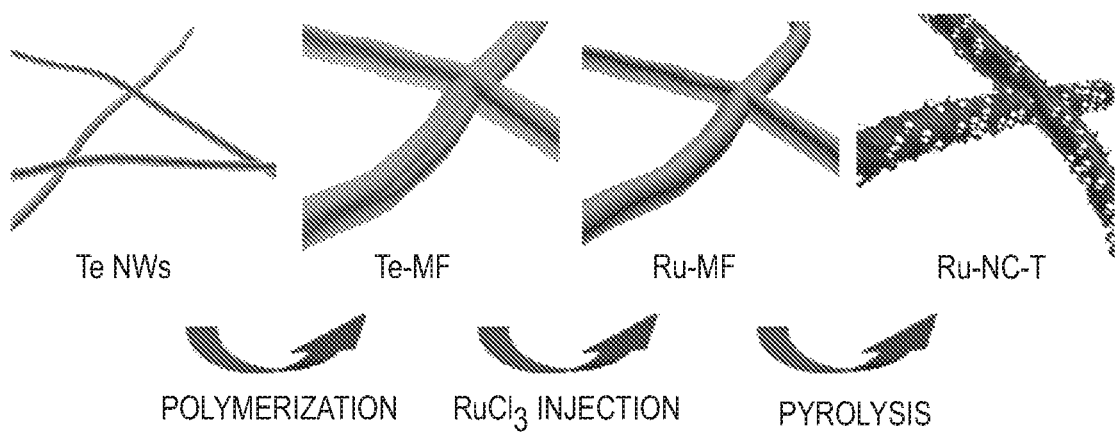
FIG. 1 is a schematic diagram of a synthesis of a catalyst composition according to an embodiment of the present disclosure.

With reference to FIG. 1, the nanowires may be formed using metals or any other materials as templates, such as tellurium, copper, silver, gold, iron, silicon, zinc, germanium, antimony, oxides or alloys thereof.

Tellurium may be used because of its low boiling point. Tellurium nanowires serve as sacrificial template to produce carbon nanowires, which result from pyrolysis of the resin shell, as described in further detail below. Other metals and alloys may also be used, such as those disclosed herein, can also serve as templates. In metals having a high boiling point, the metal may need to be removed after pyrolysis by chemical etching or other suitable processes.

In embodiments, the nanowires may be formed using hydrothermal synthesis by reacting a precursor metal compound, such as sodium tellurite ($Na_2TeO_3$), in an aqueous solution of polyvinylpyrrolidone (PVP) with ammonia ($NH_3$) and hydrazine ($N_2H_4$). The resulting solution may then be hydrothermally heated at a temperature from about 160° C. to about 200° C. for a period of time from about 2 hours to about 4 hours to form the nanowires.

The nanowires may then be coated by a polymeric resin coating. In embodiments, the resin coating may be formed by polymerization of melamine and formaldehyde. The coating may be any polymeric composition that provides a source of carbon and nitrogen atoms for active catalyst sites, namely, a carbon matrix for embedding a catalyst metal. Suitable polymers for forming the resin coating include, but are not limited to, polyaniline, polypyrrole, etc.

In embodiments, where the resin coating is formed by polymerization of melamine and formaldehyde, the coating may be formed by placing the nanowires dispersed in water into an aqueous solution of melamine heated to about 90° C. along with sodium hydroxide and formaldehyde from about 5 hours to about 10 hours.

Once the nanowires are coated, the catalyst metals may be embedded in the resin coating. Suitable catalyst metals include transition metals, such as ruthenium, rhodium, palladium, and iridium. The catalyst metals may be embedded by reacting a metal halide salt in a solvent with coated nanowires. Suitable solvents include, but are not limited to, ethanol, tetrahydrofuran, acetonitrile. The solution may be heated from about 40° C. to about 60° C. and may run from about 10 hours to about 14 hours. The transition metal may form complexes with the metal of the nanowires, such as $RuTe_x$ complexes in embodiments where the transition metal is Ru and the nanowires are Te.

After reaction of the metal halide with the coated nanowires, the product is pyrolyzed at a temperature from about 500° C. to about 800° C. to form the catalyst composition according to the present disclosure. In embodiments, the pyrolysis temperature may be from about 600° C. to about 800° C. Pyrolysis may last from about 2 hours to about 5 hours and the temperature may be increased from about 25° C. at a rate of from about 2° C. per minute to about 10° C. per minute. In addition, nitrogen gas may be supplied to the coated nanowires during pyrolysis at a rate from about 100 cubic centimeters per minute (cc/min) to about 400 cubic centimeters per minute (cc/min), in embodiments, the rate may be from about 200 cc/min to about 300 cc/min.

Figure 13:
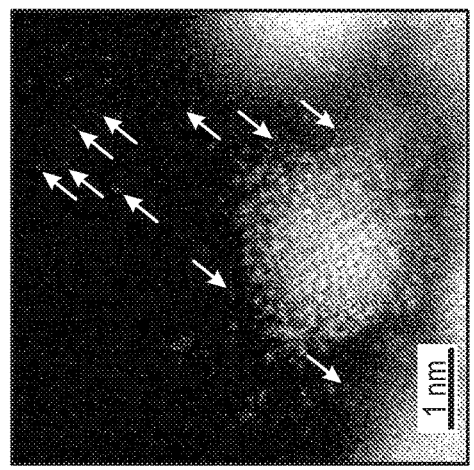
FIG. 13 is a 1 nm scale TEM image of the nanowire of FIG. 11 according to an embodiment of the present disclosure.
Figure 19:
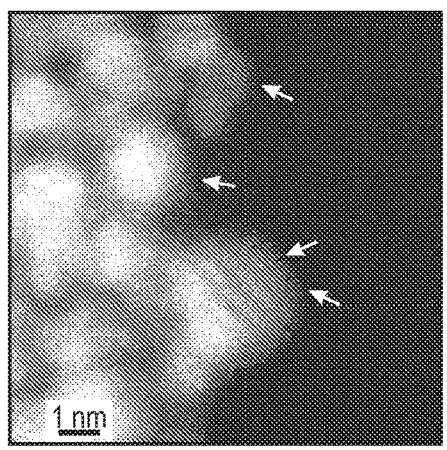
FIG. 19 is a 1 nm scale HAADF-STEM image of a nanowire of FIG. 18 according to an embodiment of the present disclosure.
Figure 20:
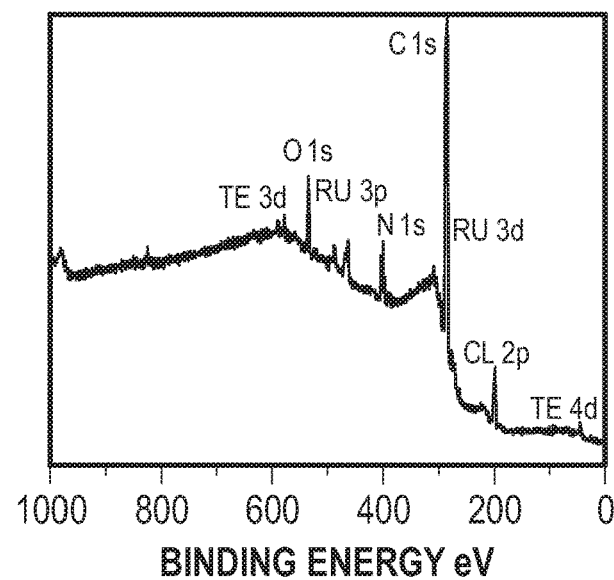
FIG. 20 is a plot of an X-ray photoelectron spectrum (XPS) of the nanowire of FIG. 2.
Figure 21:
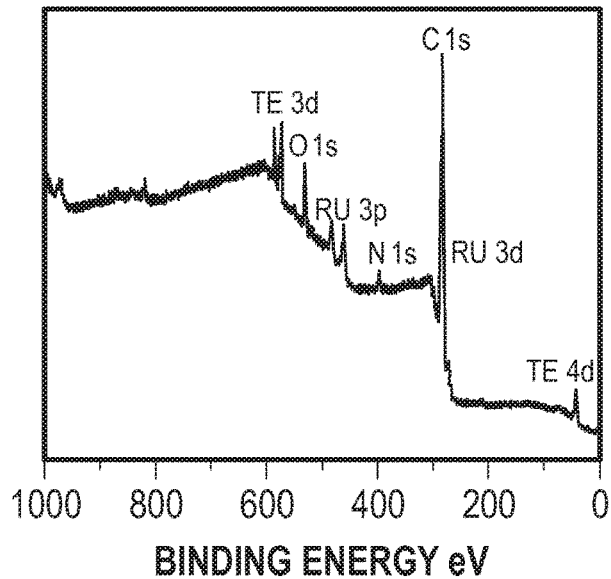
FIG. 21 is a plot of an XPS of the nanowires of FIG. 16.
Figure 22:
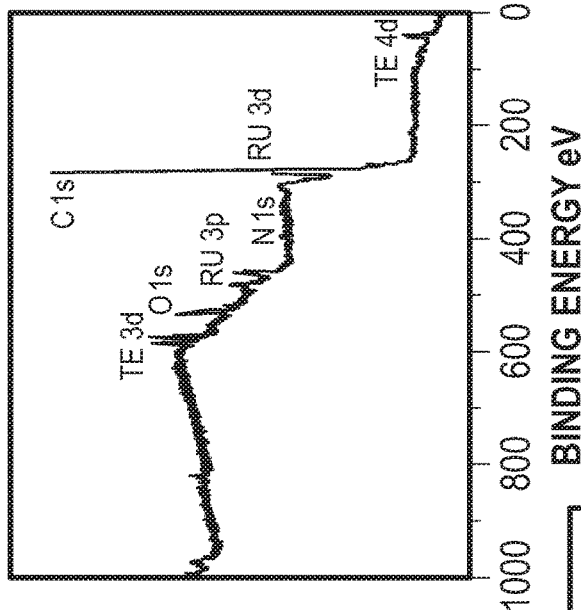
FIG. 22 is a plot of an XPS of the nanowire of FIG. 17.
Figure 24:
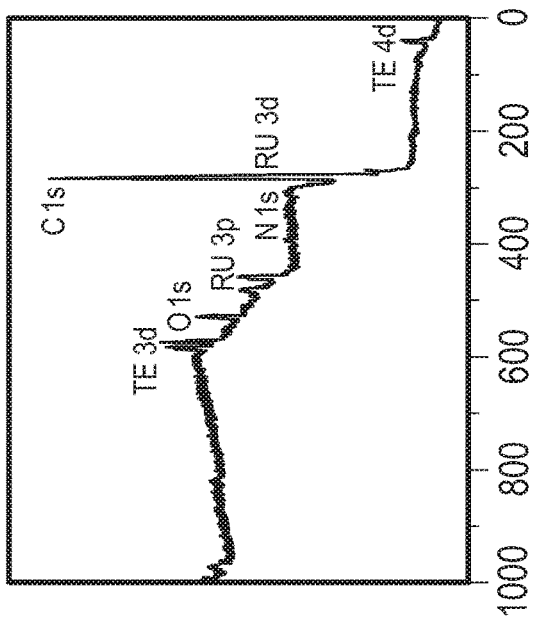
FIG. 24 is a plot of an XPS of the nanowire of FIG. 8.
Figure 23:
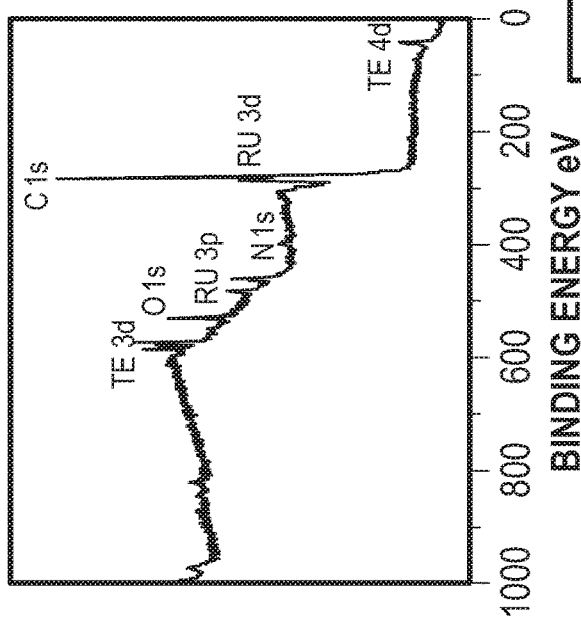
FIG. 23 is a plot of an XPS of the nanowire of FIG. 18.

The catalyst composition according to the present disclosure includes a nanowire having a polymeric resin having the catalyst metal embedded therein. Thus, the carbon matrix is co-doped with ruthenium and nitrogen due to the pyrolysis of the coated nanowires. In particular, the catalyst metal, e.g., ruthenium, is present in the carbon matrix of the resin as nanoparticle species and atomic species. However, as described in detail below in the Examples, HER activity and catalytic activity of the presently disclosed catalyst composition is primarily due to atomically dispersed Ru coordinated to N and C, thereby forming RuC$_x$N$_y$ moieties, such as RuC$_2$N$_2$, with only minor contributions from Ru nanoparticles. In particular, the increased catalytic activity of the presently disclosed catalyst composition is due to the individual catalyst metal atoms being embedded within a carbon matrix of the resin coating. Accordingly, the catalyst composition according to the present disclosure may include only atomic catalyst metal. As shown in FIGS. 13 and 19, which show Ru nanoparticles and atomic Ru disposed throughout the carbon matrix of the resin coated nanowire. A ratio of the number of atomic species (e.g., RuC$_x$N$_y$ moieties) of the catalyst metal to the number of nanoparticle species of the catalyst metal may be from about 0.2 to about 0.7. In embodiments, the ratio may be from about 0.3 to about 0.5. In further embodiments, the ratio of the atomic species to the nanoparticle species may be from about 0.35 to about 0.45.

The catalyst composition according to the present disclosure may be used in hydrogen evolution reaction (HER), a water splitting electrolysis reaction. The rate of hydrogen generation from the HER according to present disclosure may be affected by the pH and temperature at which HER is carried out. Accordingly, the HER may be carried out at a pH from about 1 to about 14, in embodiments, from about 9 to about 13, and in further embodiments, from about 10 to about 12. The HER may also be carried at a temperature from about 22° C. and 100° C., in embodiments from about 30° C. to about 80° C., and in further embodiments, from about 40° C. to about 60° C. HER may be carried with any suitable water, however, certain impurities present in the water may affect the rate of hydrogen generation.

The method for hydrogen generation according to the present disclosure includes providing a metal-catalyst composition according to the present disclosure and exposing the metal-catalyst composition to a hydrogen containing compound, such as water or an aqueous solution. Exposure to the compound may be carried by placing the catalyst composition in a liquid container.

The hydrogen containing compound may be an aqueous alkaline medium, which may be prepared by dissolving an alkaline compound including alkali metal hydroxides such as lithium hydroxide, sodium hydroxide and potassium hydroxide, and tetraalkylammonium hydroxides such as tetramethylammonium hydroxide and tetraethylammonium hydroxide. Suitable solvents include pure water or water that is mixed with various water-miscible solvents including alcohols such as methyl and ethyl alcohols, dimethylformamide, dimethylacetamide, ethyleneglycol, diethyleneglycol and the like. The aqueous alkaline medium may include from about 1% by to about 30% by weight of the alkaline compound dissolved therein. The generated hydrogen may be collected or syphoned for later use. In further embodiments, the generated hydrogen may be used directly with any system and or apparatus that utilizes hydrogen as a source of fuel, such as a fuel cell.

The following Examples illustrate embodiments of the present disclosure. These Examples are intended to be illustrative only and are not intended to limit the scope of the present disclosure. Also, parts and percentages are by weight unless otherwise indicated. As used herein, "room temperature" or "ambient temperature" refers to a temperature from about 20° C. to about 25° C.

EXAMPLES

Example 1

This example describes synthesis of tellurium (Te) nanowires, which are used as a substrate for forming a catalyst composition. Approximately 0.18 grams (g) of sodium tellurite (Na$_2$TeO$_3$) and about 2 g of polyvinylpyrrolidone (PVP) were dissolved in about 66 mL of NANOPURE™ water, filtered using Barnstead Nanopure Water System, under stirring to form a homogeneous solution, into which about 6.7 milliliters (mL) of ammonia (NH$_3$) and about 3.3 mL of hydrazine (N$_2$H$_4$) were added. The solution was then transferred to a 100 mL polytetrafluoroethylene-lined autoclave container and heated at about 180° C. for approximately 3 hours. The autoclave was then cooled down naturally, and the solution was stored in a refrigerator at about 4° C.

Example 2

This example describes the synthesis of a melamine-formaldehyde polymer coating on the nanowires of Example 1. About 10 mL of the solution containing the nanowires of Example 1 was centrifuged at 3,000 revolutions per minute (RPM) for about 2 minutes with the addition of acetone as a sinking agent. After washing by water and ethanol three times, nanowires of Example 1 were dispersed in about 10 mL of water. Separately, about 0.126 g of melamine in approximately 10 mL of water was added into a 50 mL round-bottom flask, and the solution was heated at about 90° C. under magnetic stirring. The aqueous solution of the nanowires of Example 1, 20 microliters (μL) of NaOH solution having a concentration of about 0.2 molar (M), and approximately 0.53 mL of formaldehyde, were then added to the melamine solution. The resulting solution was heated at 90° C. for 7 hours before being cooled down naturally. The product was collected by centrifugation at about 5,000 rpm for approximately 5 minutes, washed with water and ethanol, and dried in a vacuum chamber for about 24 hours.

Example 3

This example describes synthesis of ruthenium and nitrogen co-doped carbon matrix on the melamine-formaldehyde coated nanowires of Example 2. About 50 milligrams (mg) of coated nanowires of Example 2 was dissolved into about 30 mL of ethanol under magnetic stirring at approximately 350 RPM and heated at approximately 50° C. About 40 mg of ruthenium chloride (RuCl$_3$) was then added to the nanowires/ethanol dispersion. The color of the mixture was observed to change from blue to brown, indicative of reaction between Te and Ru$^{3+}$ forming RuTe$_x$ complexes. The reaction was run overnight, for approximately 12 hours, and the solids were collected by centrifugation and vacuum-dried.

The intermediate product, ruthenium doped melamine-formaldehyde coated (Ru-MF) nanowires, was pyrolized by placing in a tube furnace and heated at four controlled temperatures, namely, about 500, 600, 700, and 800° C., each for 3 hours at a heating rate of about 5° C. per minute. The nitrogen flow was maintained at about 200 cubic centimeters per minute (cc/min). The samples of ruthenium and nitrogen doped melamine-formaldehyde coated nanowires, were denoted as Ru—NC-T with T denoting the pyrolysis temperature of 500, 600, 700 or 800, respectively.

In addition, control samples were also prepared. A first control sample was prepared using about 5 mg of RuCl$_3$ (approximately ⅛ of the amount of 40 mg used for the synthesis of the above Ru—NC-T samples). All of the other conditions were kept the same, and the pyrolysis was carried out at about 700° C. This sample was referred to as Ru—

Figure 50:
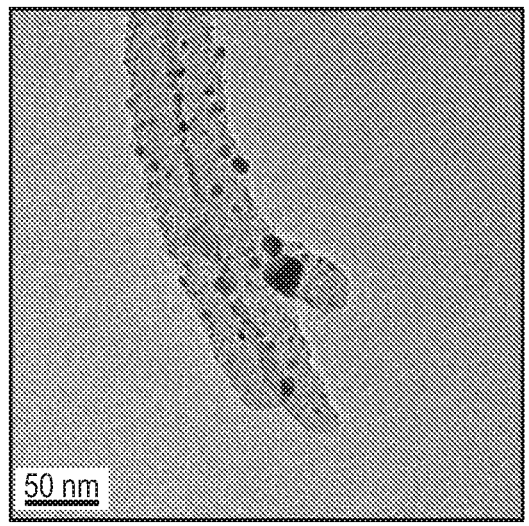
FIG. 50 is a 50 nm scale TEM image of the nanowire synthesized under the same conditions as that of FIG. 18, except that the loading of the $RuCl_3$ precursor is reduced to ⅛ of that in FIG. 18.

NC-700 (⅛ Ru). FIG. 50 shows a 50 nm scale TEM image of the Ru—NC-700 nanowires.

Figure 51:
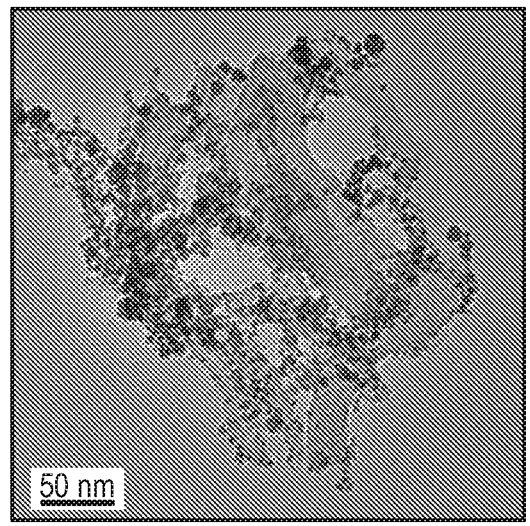
FIG. 51 is a 50 nm scale TEM image of ruthenium nanoparticles (synthesized by reducing $RuCl_3$ with $NaBH_4$) deposited onto pyrolyzed melamine-formaldehyde coated nanowires.

A second control sample was prepared using about 5 mg of $RuCl_3$, which was reduced by an excess amount of sodium borohydride ($NaBH_4$) in the presence of about 10 mg of melamine-formaldehyde coated nanowires of Example 2 at 700° C. The resulting sample was denoted as Ru NP/MF. FIG. 51 shows a 50 nm scale TEM image of Ru NP/MF nanowires.

A third control sample was also prepared by pyrolyzing melamine-formaldehyde coated nanowires of Example 2 at 700° C. without the addition of $RuCl_3$. The resulting sample was denoted as MF-700.

Example 4

This example describes imaging analysis of the Te nanowires of Example 1, coated nanowires of Example 2, and ruthenium and nitrogen doped melamine-formaldehyde coated nanowires of Example 3. Transmission electron microscopy (TEM) measurements were carried out with a FEI Talos F200x high-resolution transmission electron microscope. Double aberration-corrected high-angle annular dark field-scanning transmission electron microscopic (HAADF-STEM) measurements were carried out with a modified FEI Titan microscope (TEAM0.5) operated at 300 KeV with a HAADF detector. The STEM probe semi-angle was about 30 mrad, at a spatial resolution of about 0.05 nm.

Figure 2:
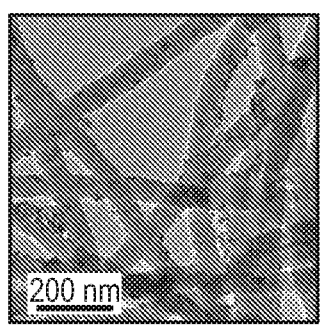
FIG. 2 is a 200 nanometers (nm) scale transmission electron microscopy (TEM) image of non-pyrolized ruthenium doped melamine-formaldehyde coated nanowires according to an embodiment of the present disclosure.
Figure 3:
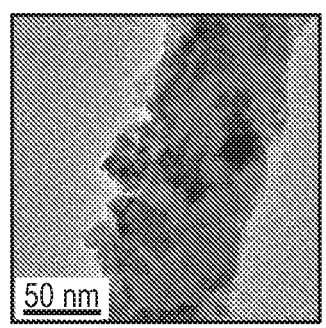
FIG. 3 is a 50 nm scale TEM image of the nanowires of FIG. 2 according to an embodiment of the present disclosure.
Figure 4:
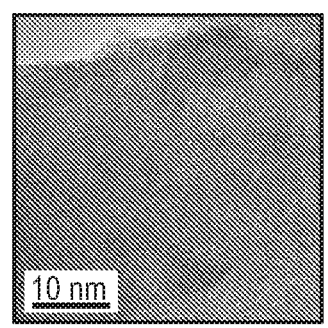
FIG. 4 is a 10 nm scale TEM image of the nanowires of FIG. 2 according to an embodiment of the present disclosure.
Figure 5:
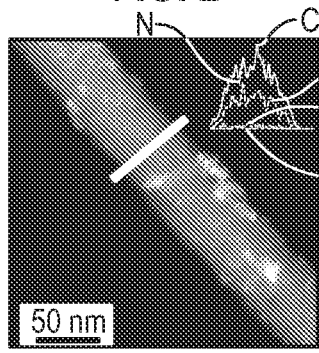
FIG. 5 is a 50 nm scale high-angle annular dark field-scanning transmission electron microscopic (HAADF-STEM) image of a nanowire of FIG. 2 with an upper-right inset of an elemental scan spectrum taken along a section line.
Figure 6:
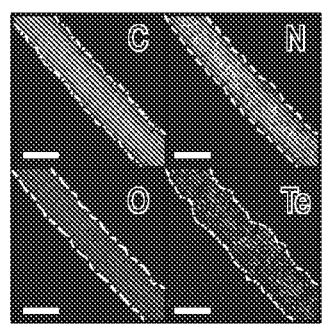
FIG. 6 is an elemental map of carbon, nitrogen, oxygen, and tellurium atoms of the nanowire of FIG. 5.
Figure 7:
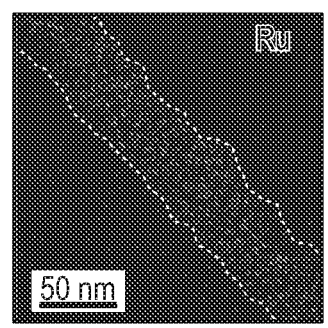
FIG. 7 is an elemental map of ruthenium atoms of the nanowire of FIG. 5.

FIGS. 2-4 show TEM images of the Ru-MF nanowires taken at about 200 nm, 50 nm, and 10 nm scales, respectively. The resulting nanowires were about 80-100 nm in diameter and several microns in length. The surface included a number of dark spots which represent the $RuTe_x$ complexes, as better shown in FIG. 3. However, there were no well-defined lattice fringes, suggesting amorphous characteristics of the resin and the complexes. Elemental mapping analysis of FIGS. 5-7 shows that the elements of C, N, O, Te and Ru were distributed evenly throughout the nanowires.

Figure 8:
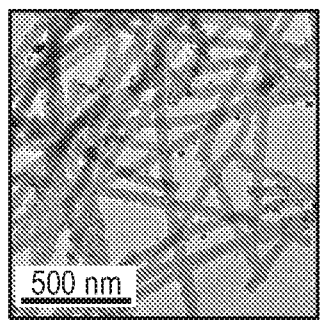
FIG. 8 is a 500 nm scale TEM image of ruthenium doped melamine-formaldehyde coated nanowires pyrolized at 800° C. according to an embodiment of the present disclosure.
Figure 9:
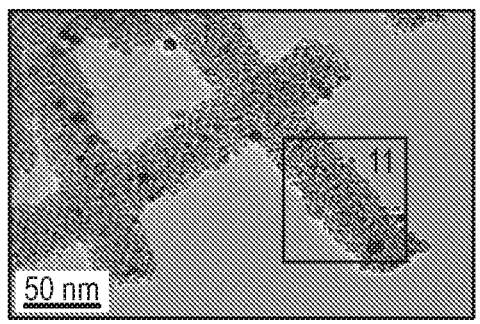
FIG. 9 is a 50 nm scale TEM image of the nanowires of FIG. 8 according to an embodiment of the present disclosure.
Figure 10:
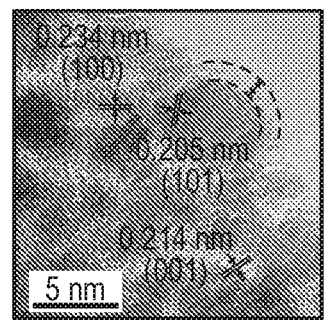
FIG. 10 is a 5 nm scale TEM image of the nanowires of FIG. 8 according to an embodiment of the present disclosure.
Figure 12:
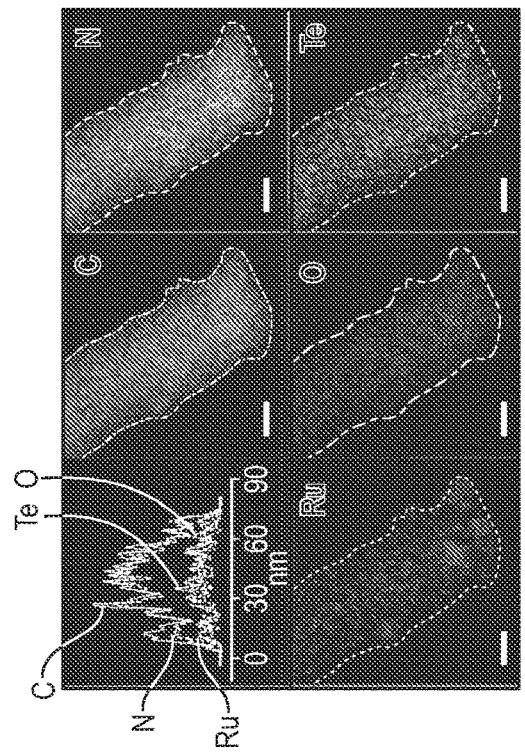
FIG. 12 is elemental scan spectra taken along a section line of FIG. 11 and elemental maps of carbon, nitrogen, ruthenium, oxygen, and tellurium atoms of the nanowire of FIG. 11.
Figure 11:
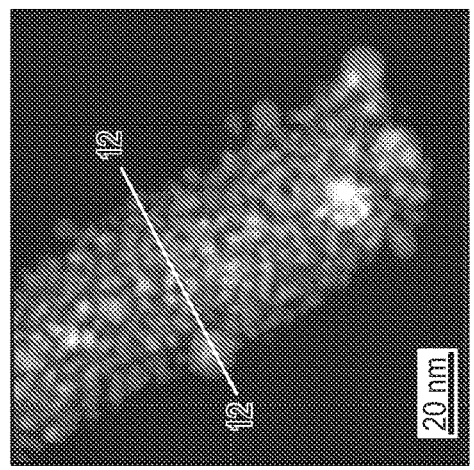
FIG. 11 is a 20 nm scale HAADF-STEM image of a nanowire of FIG. 8 according to an embodiment of the present disclosure.

FIGS. 8-10 illustrate TEM images of the Ru—NC-800 taken at about 500 nm, 50 nm, and 5 nm scales, respectively. These images illustrate that the nanowires were coated by a resin shell having Ru moieties disposed thereon. FIG. 11 is an HAADF-STEM image of an area 11 of FIG. 9 at a scale of 20 nm. FIG. 12 shows cross-sectional elemental distributions by line scans along a section line 12-12 of FIG. 11. The elemental maps of C, N, O, Te, and Ru correspond to those in the line scan spectra. The scans and the elemental distributions confirm that the nanowires were coated by the resin shell and that C and N formed a majority of the shell with Ru, O, and Te also being present, albeit in smaller quantities. FIG. 13 shows a zoomed in view of the HAADF-STEM image of an area 11 of FIG. 9 at a scale of 1 nm, with arrows pointing to ruthenium single atoms, illustrating that Ru was atomically distributed rather than being formed as Ru nanoparticles. The atomically distributed Ru was also bound to N and C atoms, resulting in Ru—N and Ru—C sites, respectively.

After pyrolysis at elevated temperatures, nanosized Ru particles were formed and embedded within the carbon matrix, as shown in FIGS. 8-10, for the Ru—NC-800 sample. Notably, the nanowire skeletons were mostly retained, though with a somewhat smaller cross-sectional diameter (about 60 nm) than that of Ru-MF, due to partial decomposition of the MF resin during the pyrolysis/carbonization process, and the dark-contrast particles (about 5-10 nm in diameter) exhibited well-defined lattice fringes, with interplanar spacings of about 0.234, 0.214, and 0.205 nm that are characteristic of the (100), (001) and (101) planes of hexagonal close-packed (hcp) Ru (JCPDS-ICDD card No. 06-0663).

Figure 14:
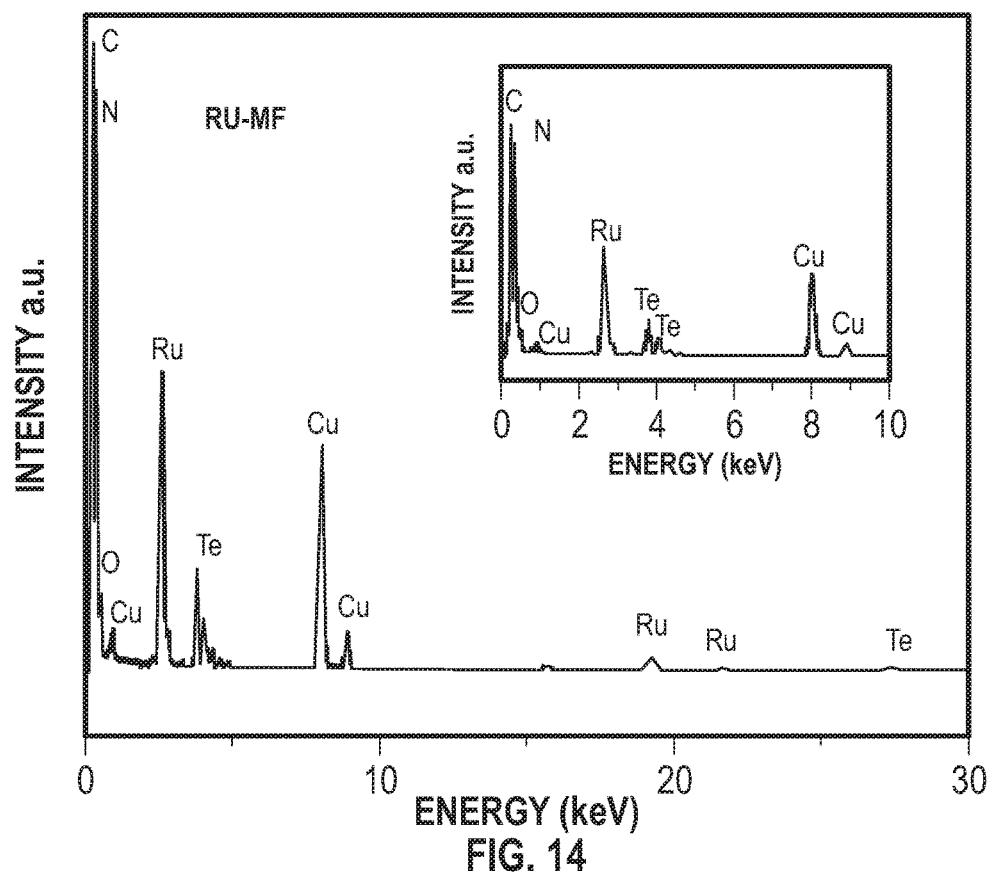
FIG. 14 is an energy-dispersive X-ray (EDX) spectrum of the nanowires of FIG. 2.
Figure 15:
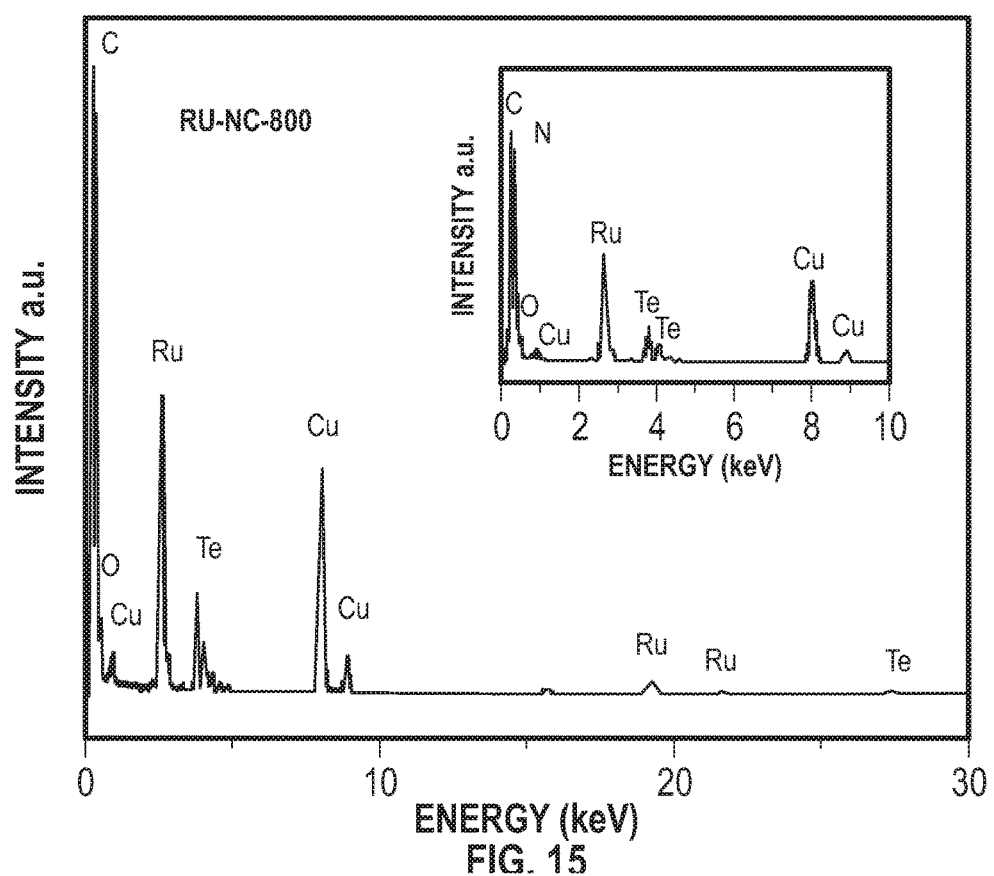
FIG. 15 is an EDX spectrum of the nanowires of FIG. 8.

FIG. 14 and FIG. 15 show energy-dispersive X-ray (EDX) of Ru-MF nanowire and Ru—NC-800 nanowire respectively, with the zoom focusing on the regions between 0 and 10 eV. In both samples, the Cu peaks were due to the TEM grids. Elemental mapping based on EDX analysis shows that all the elements of C, N, O, Te, and Ru remained readily visible as shown in FIGS. 5-7. The distributions of C, N, O, and Te were rather uniform (no other element was detected, as shown in the spectra of FIGS. 14 and 15), ruthenium exhibited apparent clustering, coincident with the formation of ruthenium nanoparticles.

Figure 18:
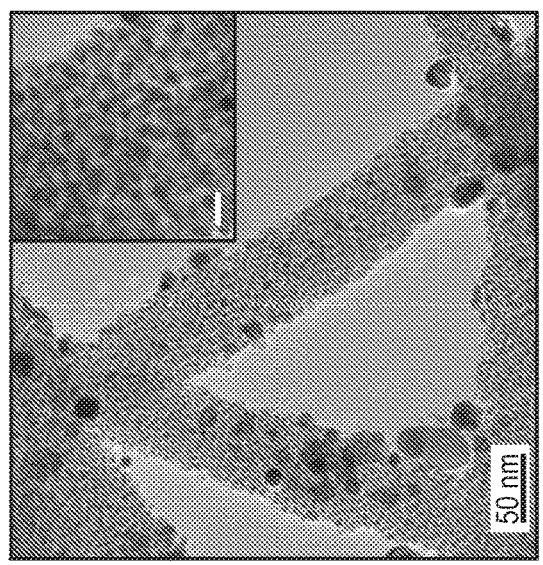
FIG. 18 is a 50 nm scale TEM image of ruthenium doped melamine-formaldehyde coated nanowires pyrolized at 700° C. according to an embodiment of the present disclosure.
Figure 17:
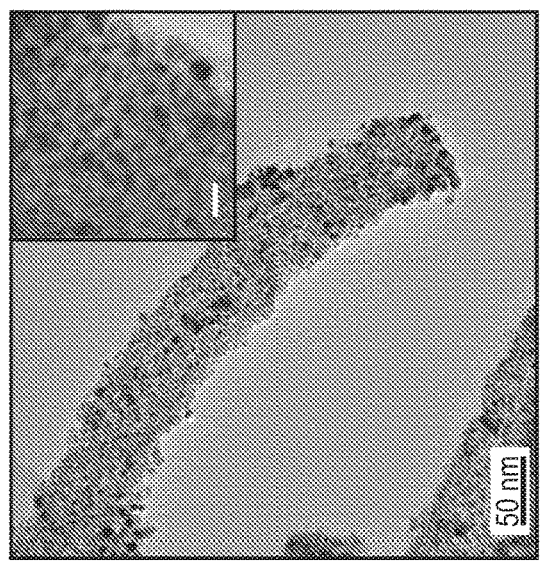
FIG. 17 is a 50 nm scale TEM image of ruthenium doped melamine-formaldehyde coated nanowires pyrolized at 600° C. according to an embodiment of the present disclosure.
Figure 16:
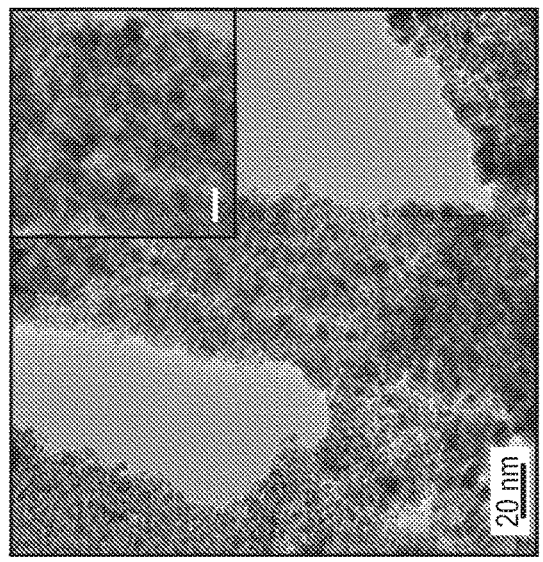
FIG. 16 is a 20 nm scale TEM image of ruthenium doped melamine-formaldehyde coated nanowires pyrolized at 500° C. according to an embodiment of the present disclosure.

FIGS. 16-18 show TEM images of Ru—NC-500 at a 20 nm scale, Ru—NC-600 at a 50 nm scale, and Ru—NC-700 at a 50 nm scale, respectively, with insets corresponding to images at higher magnifications. These images show that the nanowire morphologies did not change appreciably with pyrolysis temperature, whereas the ruthenium nanoparticles showed a marked increase of diameter with increasing pyrolysis temperature, about 1.0 nm for Ru—NC-500, about 2-3 nm for Ru—NC-600, about 5.0 nm for Ru—NC-700, and about 10 nm for Ru—NC-800 as shown in FIGS. 16-18.

The formation of ruthenium nanoparticles is due to reduction of the $RuTe_x$ complexes in Ru-MF by carbon at high temperatures, which also facilitated the migration and Ostwald ripening of the nanoparticles, leading to an increase of the nanoparticle size. However, in addition to Ru nanoparticles, a number of Ru single atoms were also readily identified within the carbon matrix, as manifested in double aberration-corrected HAADF-STEM measurements, and highlighted by arrows in FIG. 13 and FIG. 19. In particular, FIG. 19 shows a HAADF-STEM image of Ru—NC-700 at a scale 1 nm and illustrates the presence of Ru nanoparticles and Ru single atoms (arrows pointing thereto) dispersed in the carbon shell around Ru nanoparticles.

Example 5

The following example describes elemental analysis of the samples of ruthenium and nitrogen doped melamine-formaldehyde coated nanowires of Example 3. Elemental analysis was carried out using X-ray photoelectron spectra (XPS), which were acquired with a PHI-5702 XPS instrument.

Figure 25:
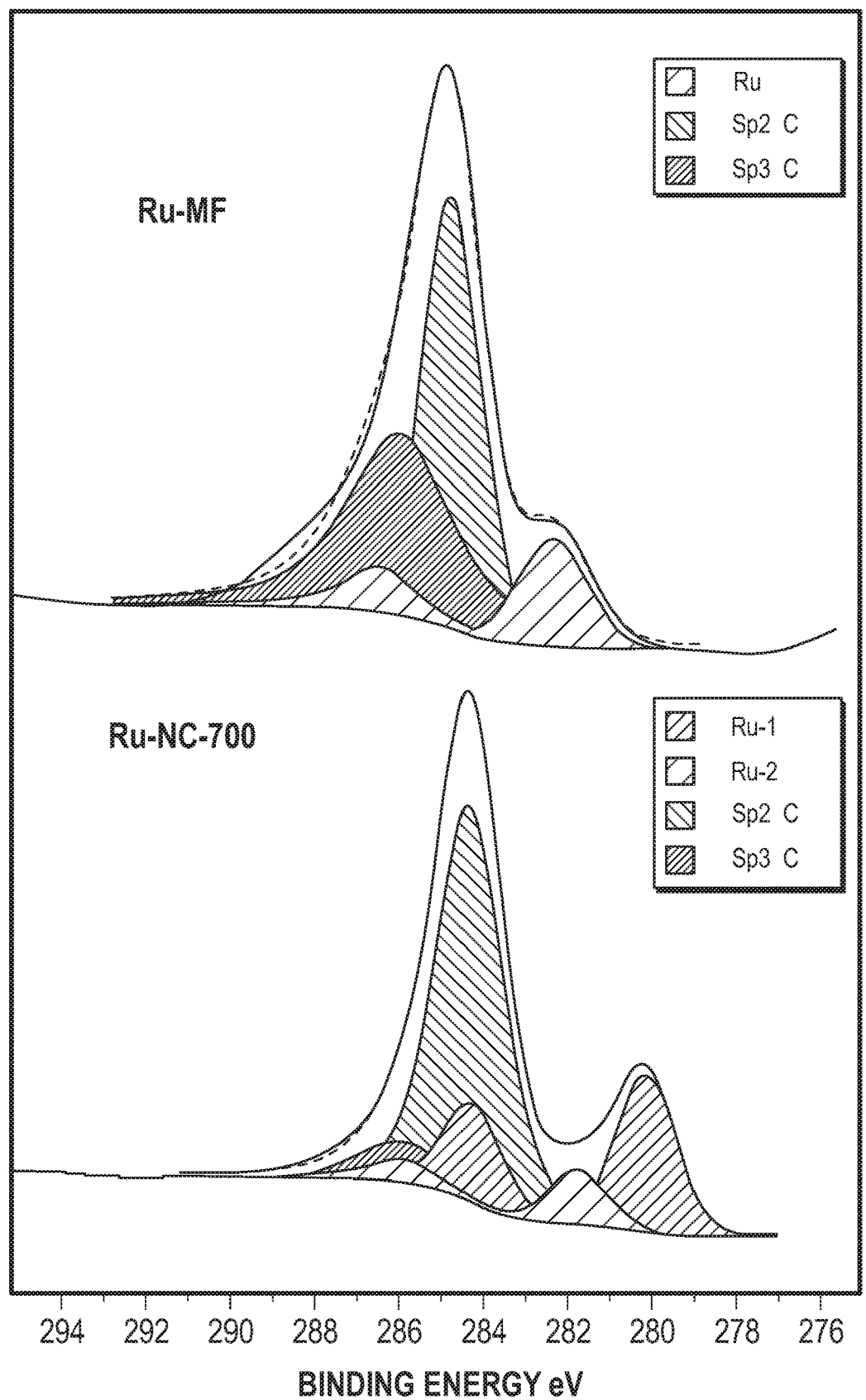
FIG. 25 is a plot of an XPS of carbon 1s and ruthenium 3d electrons of the nanowire of FIG. 2 and the nanowire of FIG. 18.

FIGS. 20-24, show XPS full survey spectra of Ru-MF, Ru—NC-500, Ru—NC-600, Ru—NC-700, and Ru—NC-800, respectively. FIG. 25 shows XPS spectra of the C 1s and Ru 3d electrons of Ru-MF (upper plot) and Ru—NC-700 (lower plot). In FIG. 25 the dashed curve represents experimental data, shaded peaks are deconvolution fits, and the solid curve is the sum of the fits. For the Ru-MF sample, two peaks were resolved at about 284.64 eV and 285.84 eV with an atomic ratio of about 1:1, which are assigned to the sp2 carbon within the triazine ring and sp3 carbon out of the triazine ring, respectively. Similar sp2 and sp3 carbons were identified within the Ru—NC-700 sample, but the atomic ratio of Csp2/Csp3 increased markedly to about 9.2:1. For comparison, this ratio was about 4.74:1 for Ru—NC-500, 4.22:1 for Ru—NC-600, and 16.98:1 for Ru—NC-800, suggesting increasing graphitization with increasing pyrolysis temperature as shown in Table 1, below, which shows binding energy and atomic ratio of sp2 and sp3 carbons.

TABLE 1

| Sample | $Csp^2$ | $Csp^3$ | $Csp^2/Csp^3$ atomic ratio |
|---|---|---|---|
| Ru-MF | 284.64 | 285.84 | 1 |
| Ru—NC-500 | 284.20 | 285.80 | 4.71 |
| Ru—NC-600 | 284.16 | 285.80 | 4.22 |
| Ru—NC-700 | 284.17 | 285.84 | 9.20 |
| Ru—NC-800 | 284.20 | 285.80 | 16.98 |

With reference to FIGS. 28-32, which show XPS spectra of Te 3d electrons of Ru-MF, Ru—NC-500, Ru—NC-600, Ru—NC-700, and Ru—NC-800, respectively, Ru-MF sample (FIG. 28) demonstrated a pair of peaks at 282.24 eV and 286.33 eV, which are representative of the 3d electrons of Ru(III) in RuTe$_x$ complexes. As shown in FIG. 25, the Ru-MF sample only showed one pair of Ru peaks, which was also indicative of the presence of Ru(III) (shown under Ru-1 in Table 2) rather than atomic Ru (shown under Ru-2 in Table 2). This is also illustrated in Tables 2 and 3 below, which show Ru 3d binding energy (eV) and Te 3d binding energy (eV) obtained from XPS measurements, respectively.

TABLE 2

| Sample | Ru-1 (3d$_{5/2}$) | Ru-1 (3d$_{3/2}$) | Ru-2 (3d$_{5/2}$) | Ru-2 (3d$_{3/2}$) | Ru-2/Ru-1 |
|---|---|---|---|---|---|
| Ru-MF | 282.24 | 286.33 | 0 | 0 | |
| Ru—NC-500 | 280.18 | 284.28 | 281.87 | 285.97 | 0.45 |
| Ru—NC-600 | 280.06 | 284.16 | 281.75 | 285.75 | 0.36 |
| Ru—NC-700 | 280.04 | 284.14 | 281.66 | 285.76 | 0.35 |
| Ru—NC-800 | 280.00 | 284.10 | 281.50 | 285.60 | 0.31 |

TABLE 3

| Sample | 3d$_{5/2}$ | 3d$_{3/2}$ |
|---|---|---|
| Ru-MF | 576.32 | 586.74 |
| Ru—NC-500 | 575.75 | 586.09 |
| Ru—NC-600 | 575.58 | 586.04 |
| Ru—NC-700 | 575.60 | 586.04 |
| Ru—NC-800 | 575.59 | 586.04 |

Figure 33:
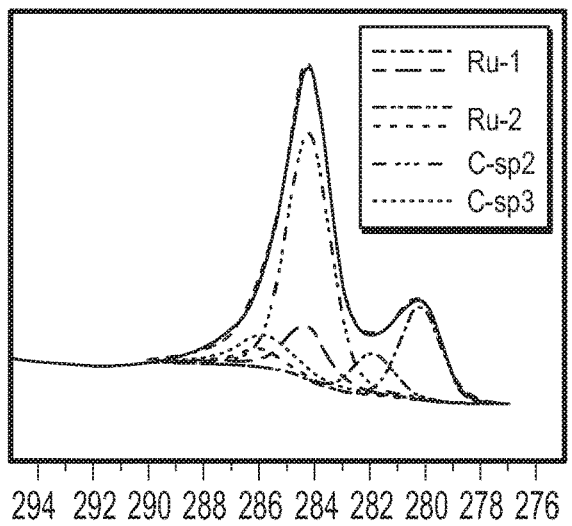
FIG. 33 is a plot of an XPS of carbon 1s and ruthenium 3d electrons of the nanowire of FIG. 16.
Figure 34:
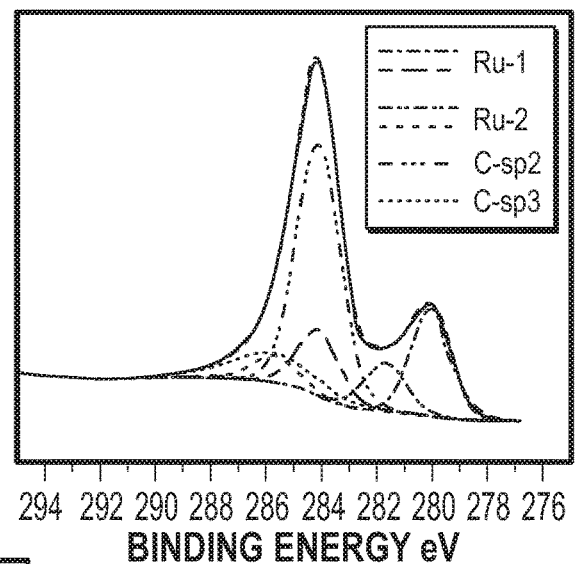
FIG. 34 is a plot of an XPS of carbon 1s and ruthenium 3d electrons of the nanowire of FIG. 17.
Figure 35:
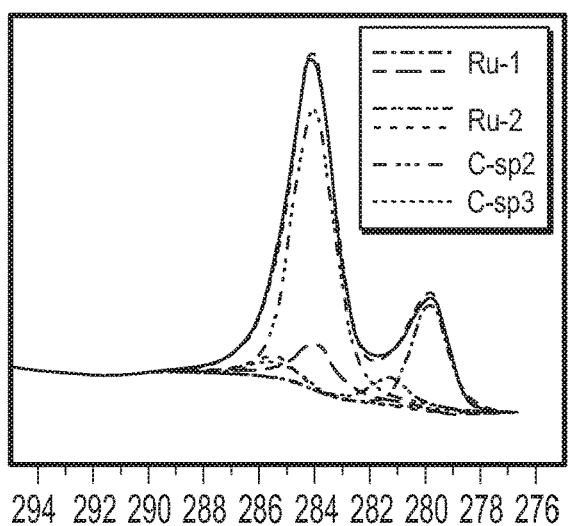
FIG. 35 is a plot of an XPS of carbon 1s and ruthenium 3d electrons of the nanowire of FIG. 8.

With reference to FIG. 25, in the Ru—NC-700 sample, two ruthenium species were resolved. The first pair (Ru-1) can be found at 280.04 and 284.14 eV and ascribed to Ru(0) in the nanoparticles, whereas the other pair (Ru-2) are at higher energies, 281.66 and 285.76 eV, attributable to Ru(II) in Ru—N/Ru—C moiety. This formation of both Ru nanoparticles and Ru atomic species embedded within the carbon matrix was due to pyrolysis. Furthermore, the presence of Ru atomic species is in agreement with results from TEM images of FIGS. 10 and 13. This is also consistent with other samples of the Ru—NC-T samples as shown in FIGS. 33-35, which show XPS spectra of carbon 1s and ruthenium 3d electrons of Ru—NC-500, Ru—NC-600, and Ru—NC-700 samples. In the spectra of FIGS. 33-35, the atomic ratio of Ru-2/Ru-1 was found to decrease with increasing pyrolysis temperature, about 0.45 for Ru—NC-500, about 0.36 for Ru—NC-600, 0.35 for Ru—NC-700, and about 0.31 for Ru—NC-800 (Table 2). That is, the fraction of atomic Ru species decreased with increasing pyrolysis temperature.

Figure 26:
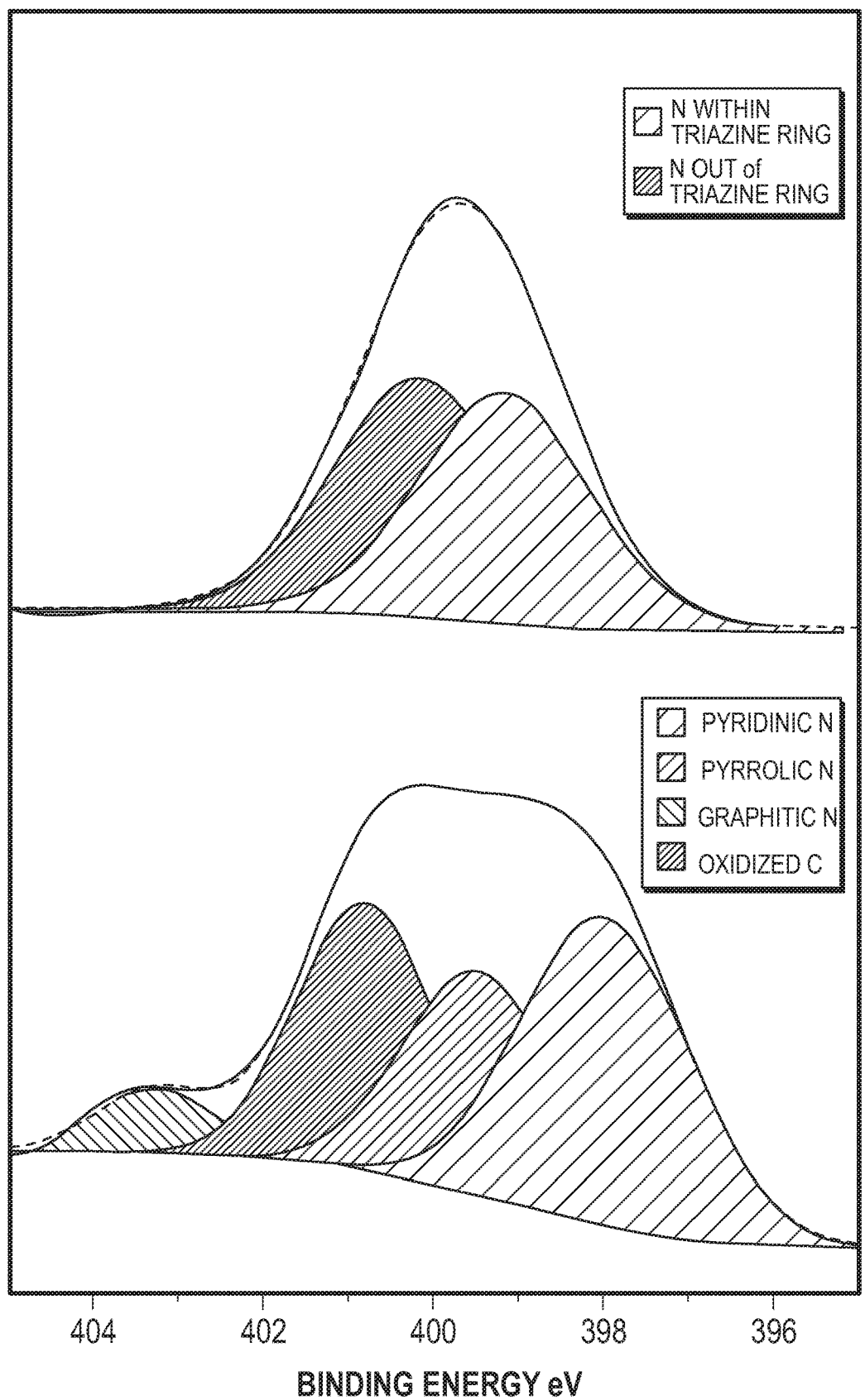
FIG. 26 is a plot of an XPS of nitrogen 1s electrons of the nanowire of FIG. 2 and the nanowire of FIG. 18.

FIG. 26 shows the XPS N 1s spectra of Ru-MF (upper plot) and Ru—NC-700 (lower plot). In FIG. 26, dashed curves represent experimental data, shaded peaks are deconvolution fits, and solid curves are the sum of the fits. These plots illustrate that nitrogen was also found to be doped into the carbon matrix. The upper plot of FIG. 26 for Ru-MF shows two peaks at about 399.16 eV and about 400.16 eV at the atomic ratio of about 1:1 are due to the nitrogen being in and out of the triazine ring, respectively. With respect to the lower plot for Ru—NC-700 and table 4 below, which shows binding energy and content derived from XPS measurements, four nitrogen peaks were resolved, namely, pyridinic N at about 398.0 eV, pyrrolic N at about 399.5 eV, graphitic N at about 400.8 eV, and oxidized N at about 403.3 eV.

TABLE 4

| | Pyridinic | | Pyrrolic | | Graphitic | | Oxidized | |
|---|---|---|---|---|---|---|---|---|
| Sample | BE (eV) | Content (%) | BE (eV) | Content (%) | BE (eV) | Content (%) | BE (eV) | Content (%) |
| Ru-MF | 399.16 (triazine ring) | | | | 400.16 (non-triazine ring) | | | |
| Ru—NC-500 | 398.27 | 53.1 | 399.62 | 19.0 | 400.66 | 11.8 | 402.11 | 16.1 |
| Ru—NC-600 | 398.06 | 49.3 | 399.47 | 23.4 | 400.84 | 17.1 | 402.50 | 10.1 |
| Ru—NC-700 | 398.00 | 39.5 | 399.47 | 26.2 | 400.80 | 28.5 | 403.27 | 5.8 |
| Ru—NC-800 | 398.00 | 25.9 | 399.50 | 29.8 | 400.80 | 37.3 | 402.50 | 6.9 |

Figure 36:
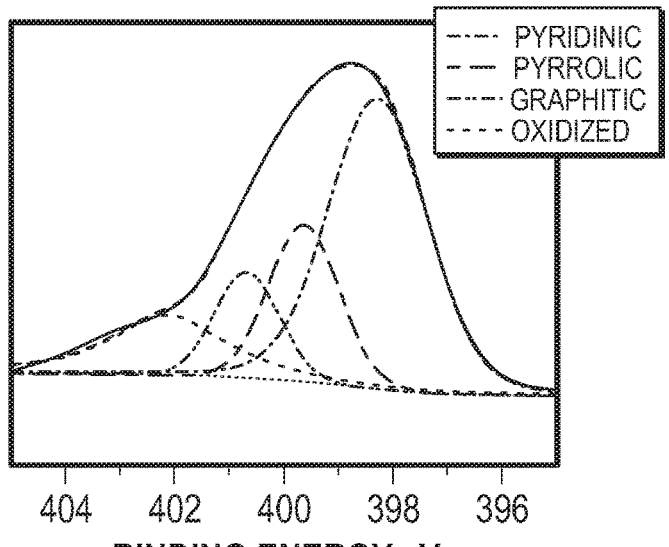
FIG. 36 is a plot of an XPS of carbon 1s and nitrogen 1s electrons of the nanowire of FIG. 16.
Figure 37:
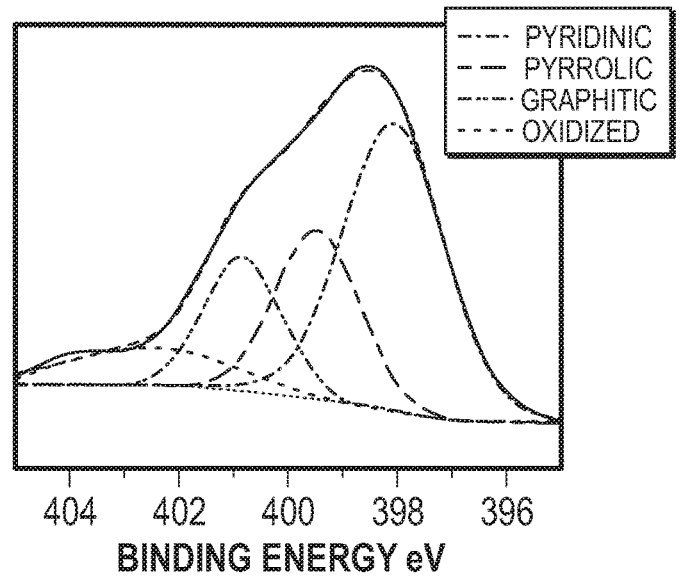
FIG. 37 is a plot of an XPS of carbon 1s and nitrogen 1s electrons of the nanowire of FIG. 17.
Figure 38:
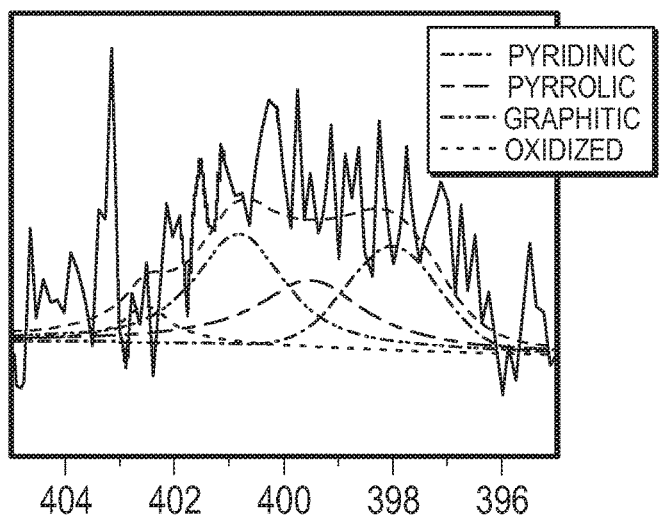
FIG. 38 is a plot of an XPS of carbon 1s and nitrogen 1s electrons of the nanowire of FIG. 8.

With reference to Table 5 below, which shows elemental composition (mole %) from XPS measurements, and FIGS. 36-38, which show XPS spectra of nitrogen is electrons of Ru—NC-500, Ru—NC-600, and Ru—NC-800, it was observed that with increasing pyrolysis temperature, the overall nitrogen content decreased accordingly, about 5.24% for Ru—NC-500, about 3.44% for Ru—NC-600, about 2.04% for Ru—NC-700, and about 0.96% for Ru—NC-800.

TABLE 5

| Sample | Ru | C | N | Te |
|---|---|---|---|---|
| Ru-MF | 1.48 | 88.56 | 9.61 | 0.34 |
| Ru—NC-500 | 4.02 | 87.69 | 5.24 | 3.05 |
| Ru—NC-600 | 4.66 | 89.38 | 3.44 | 2.51 |
| Ru—NC-700 | 3.85 | 92.12 | 2.04 | 1.98 |
| Ru—NC-800 | 3.89 | 93.03 | 0.96 | 2.11 |

Pyridinic N represented the major species of the N dopants, but the fraction decreased appreciably from about 53.1% to about 25.9%, whereas graphitic N increased from about 11.8% to about 37.3%, and pyrrolic N from about 19.0% to about 29.8% as shown in Table 4. The decrease in N content is ascribed to the discrepancy of the thermal stability of the different dopant configurations. Notably, the overall ruthenium content remained almost unchanged at around 4% among the Ru—NC-T samples as shown in Table 5.

Figure 39:
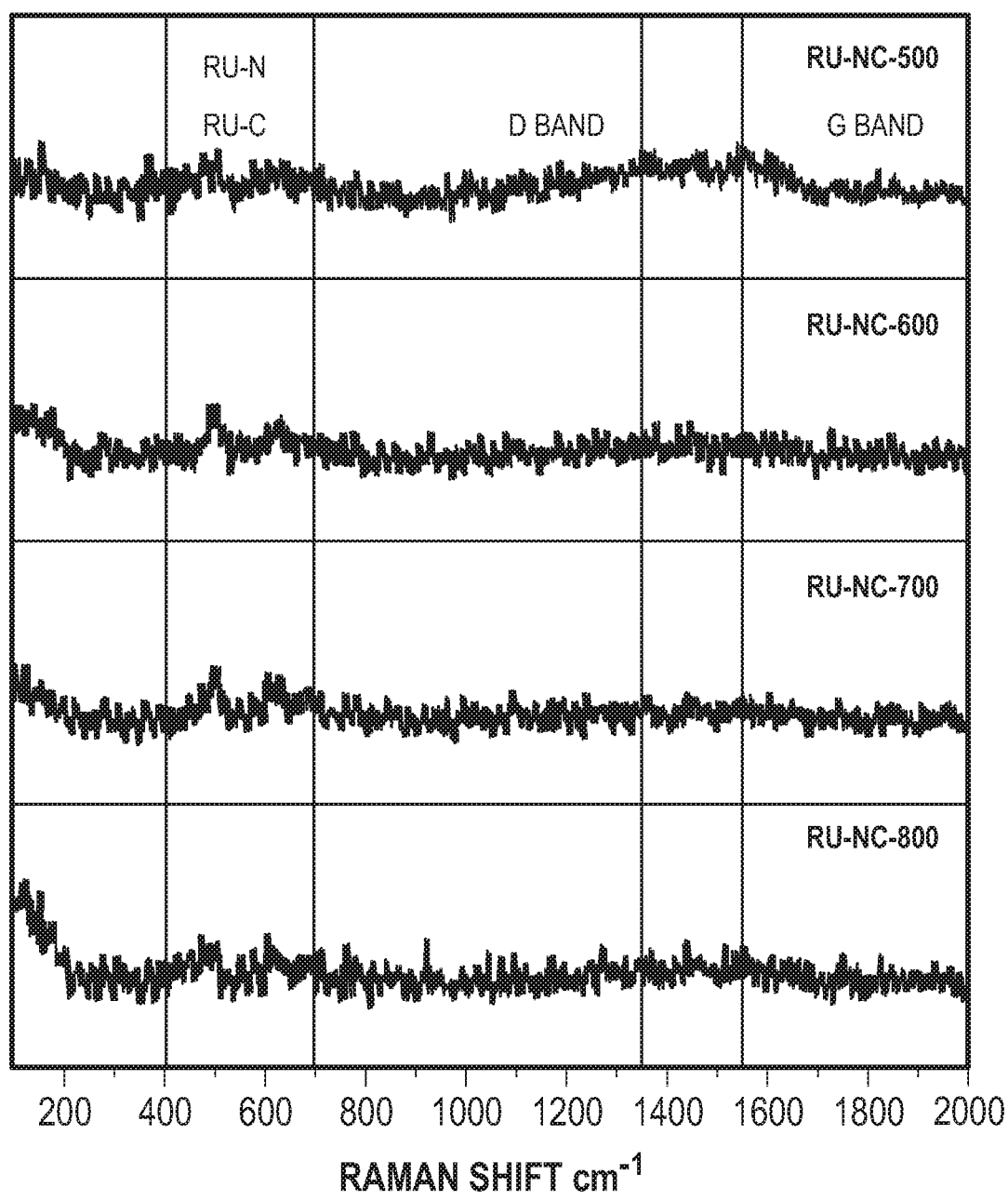
FIG. 39 is a plot of Raman spectra of nanowires of FIGS. 8, 16, 17, and 18.
Figure 40:
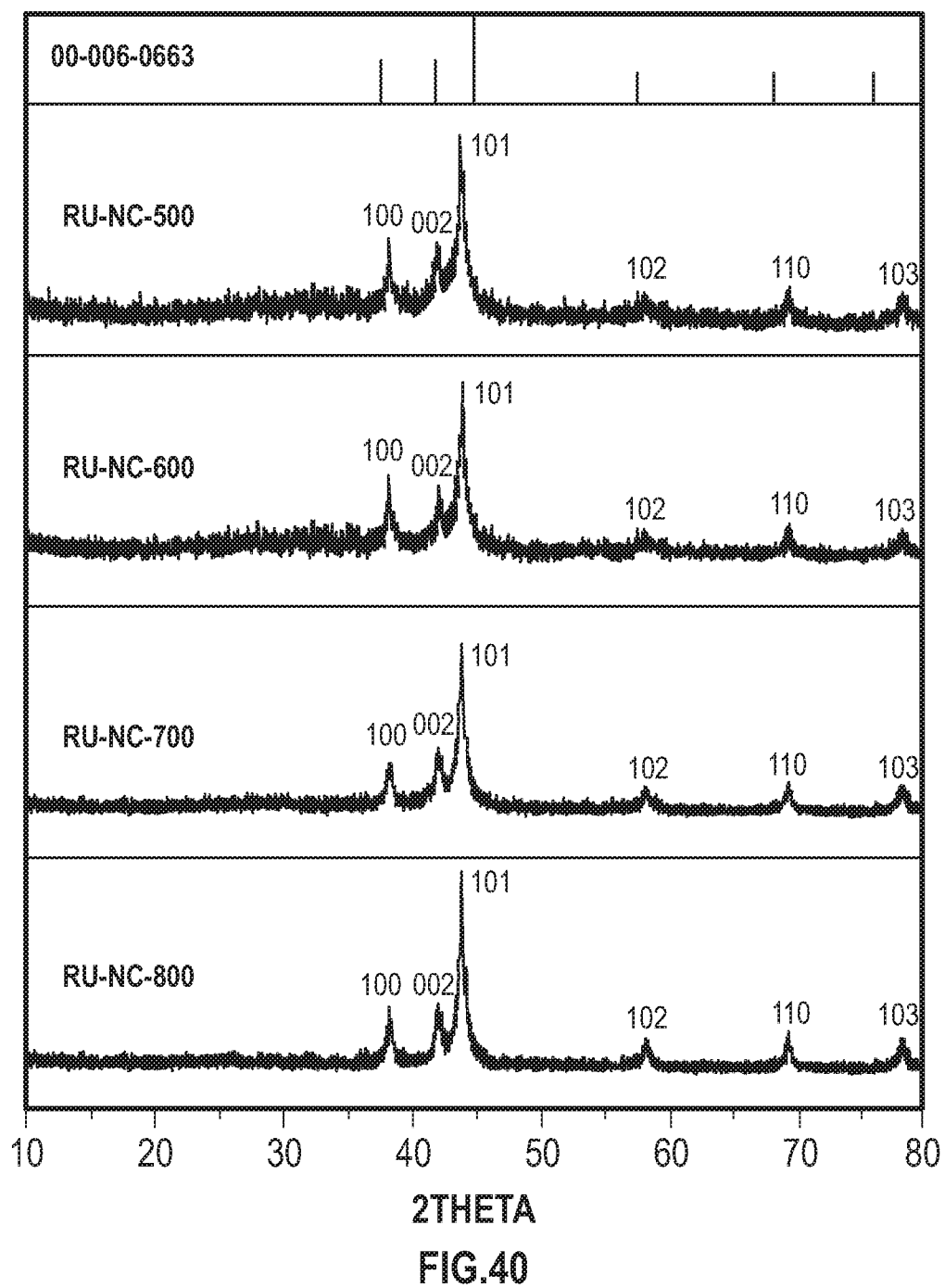
FIG. 40 shows plots of X-ray diffraction spectra of the nanowires of FIGS. 8, 16, 17, and 18.

Ru—NC-500, Ru—NC-600, Ru—NC-700, and Ru—NC-800 samples were also subjected to Raman and X-ray diffraction (XRD) studies. Raman spectra were collected with a Thermo Electron Corporation DXR Microscope. XRD studies were performed with a SmartLab 9KW X-ray diffraction system. Broad D and G bands were observed at about 1350 and 1550 cm$^{-1}$ in Raman measurements as shown in plots in FIG. 39, which shows Raman spectra for Ru—NC-T samples, indicating defective structures of the carbon matrix. In addition, the vibrational bands at 400-600 cm$^{-1}$ were assigned to Ru—N/Ru—C stretching, which was indicative of the formation of such coordination bonds in the samples. In XRD measurements as shown in FIG. 40, all Ru—NC-T samples exhibited diffraction patterns that were consistent with those of hcp Ru. In addition, a broad peak was identified within 2θ=20 to 30°, characteristic of the (002) diffraction of nanosized graphitic carbon.

X-ray absorption spectroscopy (XAS) measurements were also used to confirm the presence of atomically dispersed Ru. The powder samples of nitrogen doped melamine-formaldehyde coated nanowires of Example 3 were measured in X-ray fluorescence mode with a ruthenium foil reference. K-edge XAFS data were collected from the CLS@APS (Sector 20-BM) beamline at the Advanced Photon Source (operated at 7.0 GeV) in Argonne National Labs. All EXAFS measurements were conducted at room temperature under ambient pressure. EXAFS data was normalized and then transformed into k- and R-space using the Athena program and fitted with the Artemis program as described in Ravel, B. & Newville, M. ATHENA, ARTEMIS, HEPHAESTUS: data analysis for X-ray absorption spectroscopy using IFEFFIT. *Journal of Synchrotron Radiation* 12, 537-541 (2005). A k weighting of 3, k-range of 2.5-13.0 Å$^{-1}$ and a R-range of 1.4-2.8 Å was used for all the FT-EXAFS fitting analysis. In the fitting both the $\sigma^2$ and the $E_0$ values of the two paths were correlated to minimize the number of independent variable to ensure a reliable fitting.

Figure 27:
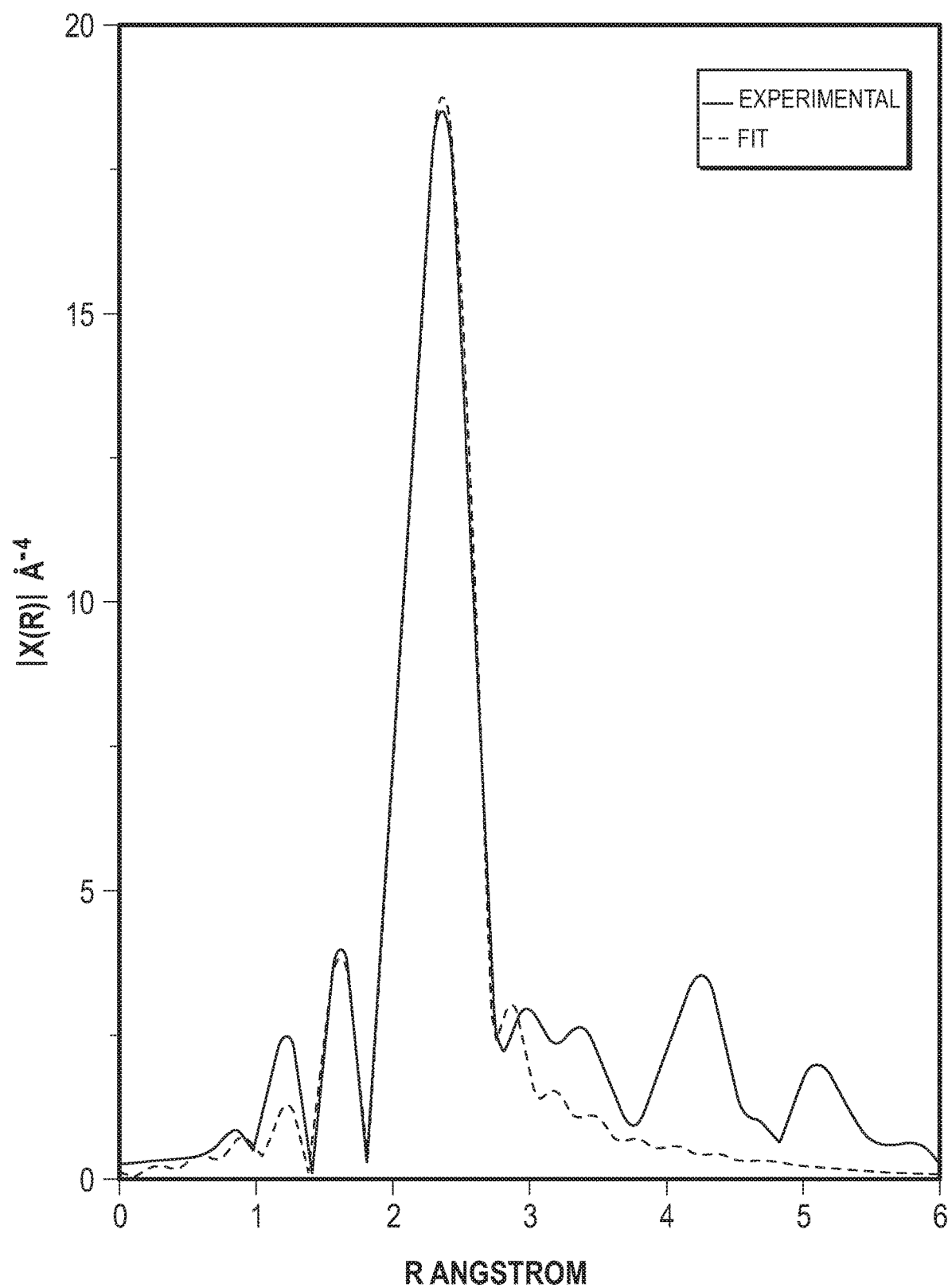
FIG. 27 are actual and experimental plots of Fourier Transforms of X-ray absorption fine structure (EXAFS) of the nanowire of FIG. 18.
Figure 28:
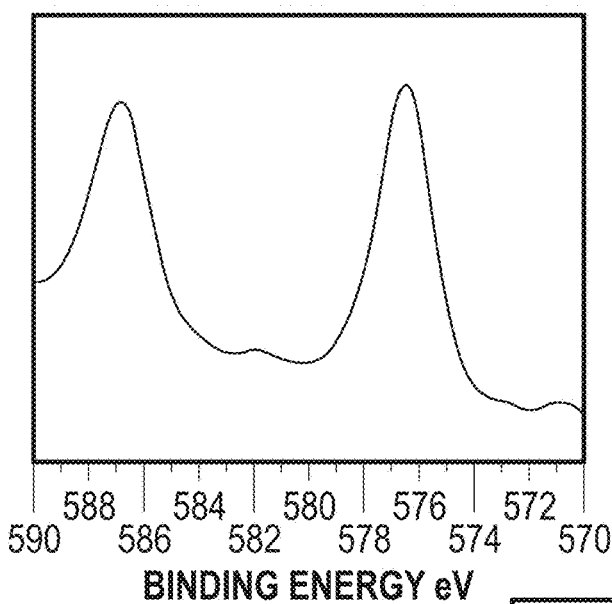
FIG. 28 is a plot of an XPS of tellurium 3d electrons of the nanowire of FIG. 2.
Figure 29:
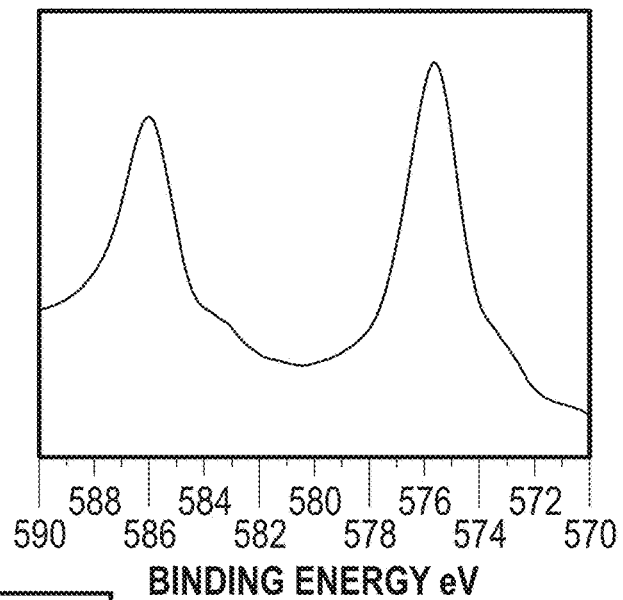
FIG. 29 is a plot of an XPS of tellurium 3d electrons of the nanowires of FIG. 16.
Figure 30:
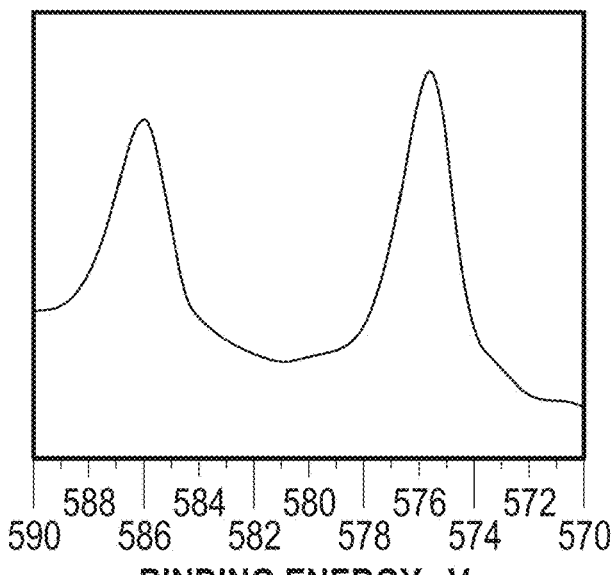
FIG. 30 is a plot of an XPS of tellurium 3d electrons of the nanowire of FIG. 17.
Figure 31:
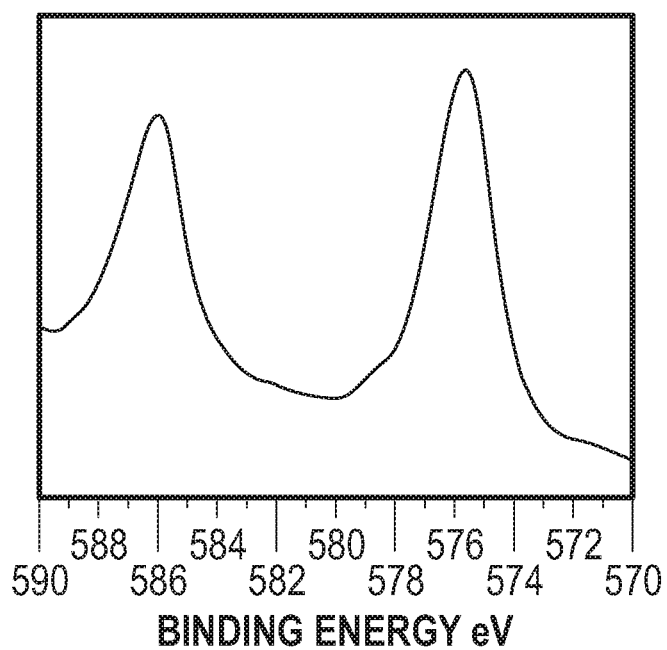
FIG. 31 is a plot of an XPS of tellurium 3d electrons of the nanowire of FIG. 18.
Figure 32:
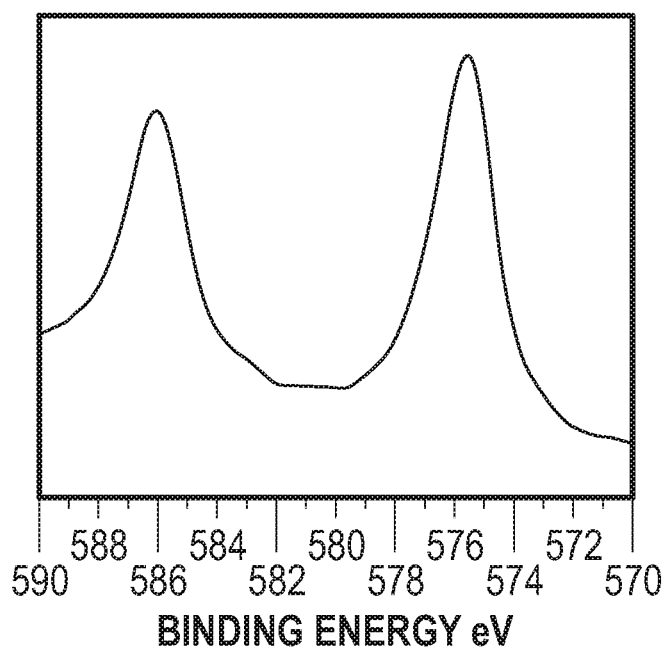
FIG. 32 is a plot of an XPS of tellurium 3d electrons of the nanowire of FIG. 8.

With reference to FIG. 27, FT-EXAFS data for Ru—NC-700 experimental data is plotted as a dashed curve and best, theoretical fit is plotted as a dashed curve. Two main peaks were fitted using a Ru—Ru and Ru—N/C (C and N are indistinguishable in the fitting) shell with a bond distance of 2.68 and 2.03 Å, respectively. Based on the fitting, the coordination number (CN) was estimated to be 6.6 for Ru—Ru, and 1.3 for Ru—N/Ru—C as shown in Table 6 below, which shows EXFAS fitting results of Ru—NC-700 from the plot of FIG. 27.

TABLE 6

| bond | Coordination number (CN) | Bond length R (Å) | $\sigma^2$ (Å) ×10$^{-3}$ | $E_0$ (eV) | R factor |
|---|---|---|---|---|---|
| Ru—N/Ru—C | 1.3 (5) | 2.03 (2) | 4.2 (4) | −2.6 (9) | 0.0021 |
| Ru—Ru | 6.6 (5) | 2.678 (3) | 4.2 (4) | −2.6 (9) | 0.0021 |

The Ru—Ru value was lower than that (12) of bulk Ru, due to the formation of ruthenium nanoparticles, whereas the Ru—N/Ru—C value was abnormally large for the size of the nanoparticles observed in FIGS. 8-10. These two findings suggest the existence of both ruthenium nanoparticles and single atoms bonded to the N and/or C in the carbon matrix, consistent with the HAADF-STEM results in FIGS. 11 and 13.

Example 6

The following example describes electrochemical properties of ruthenium and nitrogen doped melamine-formaldehyde coated nanowires of Example 3. Electrochemical measurements were carried out with a CHI 710 electrochemical workstation in a conventional three-electrode configuration. A silver/silver chloride (Ag/AgCl) electrode in 0.1 M potassium chloride (KCl) was used as a reference electrode and a graphite rod as the counter electrode. The reference electrode was calibrated against a reversible hydrogen electrode (RHE) and all potentials in the present study were referred to this RHE. To prepare catalyst inks, about 4 mg of the catalysts obtained above was added into approximately 1 mL of ethanol, about 10 μL of Nafion® solution under sonication to form a homogeneous solution. About 10 μL of the inks was then dropcast on a clean glassy carbon disk electrode (surface area of about 0.196 cm$^2$) at a loading of approximately 0.20 mg/cm$^2$. Electrochemical impedance measurements were carried out with a Gamry Reference 600 instrument. IR-composition was set to about 85% of solution resistance in all measurements.

Figure 41:
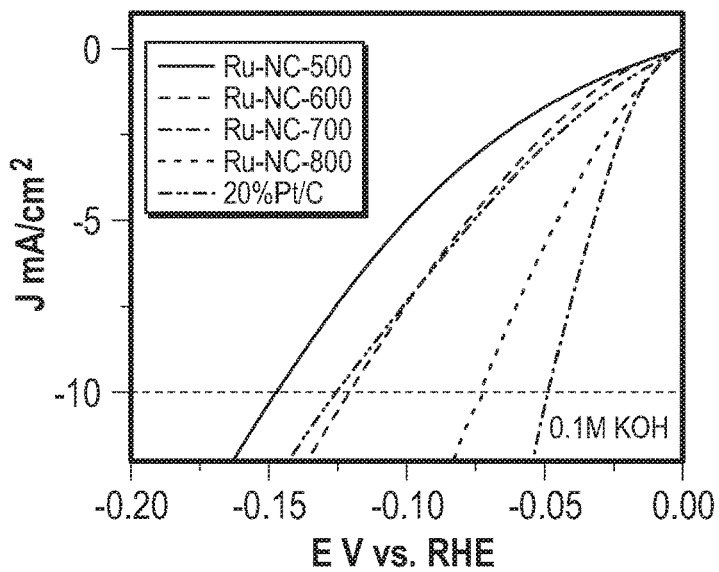
FIG. 41 is a plot of linear sweep voltammetry (LSV) curves of the nanowires of FIGS. 8, 16, 17, and 18 and 20% by weight platinum on carbon (Pt/C) catalyst in 0.1 M potassium hydroxide (KOH)

Electrochemical properties of Ru—NC-T samples were evaluated in hydrogen evolution reactions (HER). The Ru—NC-T samples exhibited significant HER activity in alkaline media, in comparison to commercially available platinum-on-carbon (Pt/C) catalysts. With reference to FIG. 41, which shows linear sweep voltammetry (LSV) curves of Ru—NC-T and 20% by weight of Pt Pt/C in 0.1 M KOH, all Ru—NC-T samples exhibited nonzero cathodic currents, signifying apparent HER activity, although the activity varied among the samples with increasingly negative electrode potentials.

With reference to Table 7 below, which shows HER performance of Ru—NC-T samples and Pt/C catalyst in 0.1 M KOH, the $\eta_{10}$ parameter of the HER activity was identified at about −146 mV for Ru—NC-500, about −120 mV for Ru—NC-600, about −47 mV for Ru—NC-700, and about −72 mV for Ru—NC-800. All but Ru—NC-500 showed an $\eta_{10}$ that was even lower than that for commercial Pt/C catalyst, which has $\eta_{10}$ of about −125 mV.

TABLE 7

| Sample | $R_{CT}$ (Ω) | Tafel slope (mV/dec) | $\eta_{10}$ (mV) |
|---|---|---|---|
| Ru—NC-500 | 154 | 64 | −146 |
| Ru—NC-600 | 129 | 43 | −120 |
| Ru—NC-700 | 20.7 | 14 | −47 |
| Ru—NC-800 | 38.6 | 24 | −72 |
| 20% Pt/C | 136 | 39 | −125 |

Figure 42:
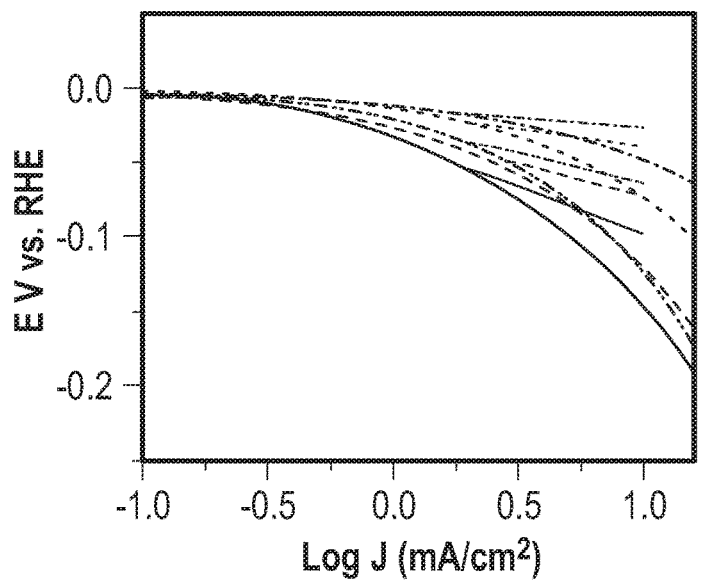
FIG. 42 is a plot of Tafel curves of the nanowires of FIGS. 8, 16, 17, and 18 and 20% Pt/C catalyst in 0.1 M KOH.

Consistent behaviors were also observed in the Tafel curves of FIG. 42, the Tafel slope was about 24 mV/dec for Ru—NC-800, about 14 mV/dec for Ru—NC-700, about 43 mV/dec for Ru—NC-600, and about 64 mV/dec for Ru—NC-500, in comparison to about 39 mV/dec for Pt/C. This suggests that Ru—NC-700 and Ru—NC-800 samples even outperformed Pt/C towards HER in alkaline media, with Ru—NC-700 standing out as the best sample among the series.

Figure 43:
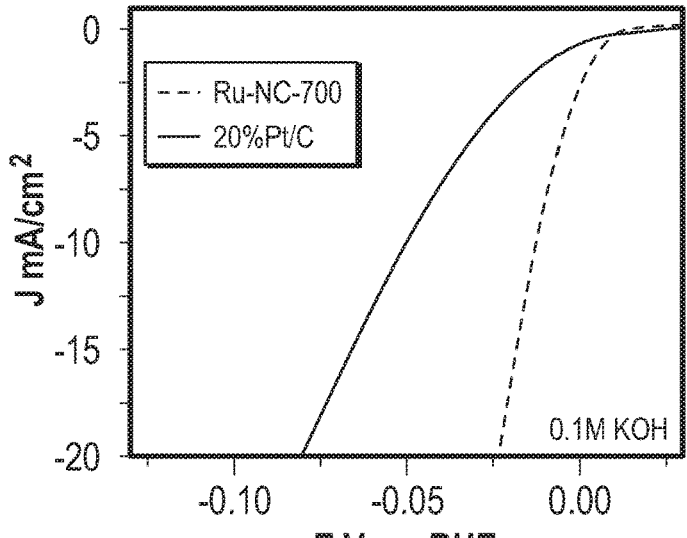
FIG. 43 is a plot of LSV curves of the nanowire of FIG. 18 and 20% Pt/C catalyst in 0.1 M KOH.
Figure 44:
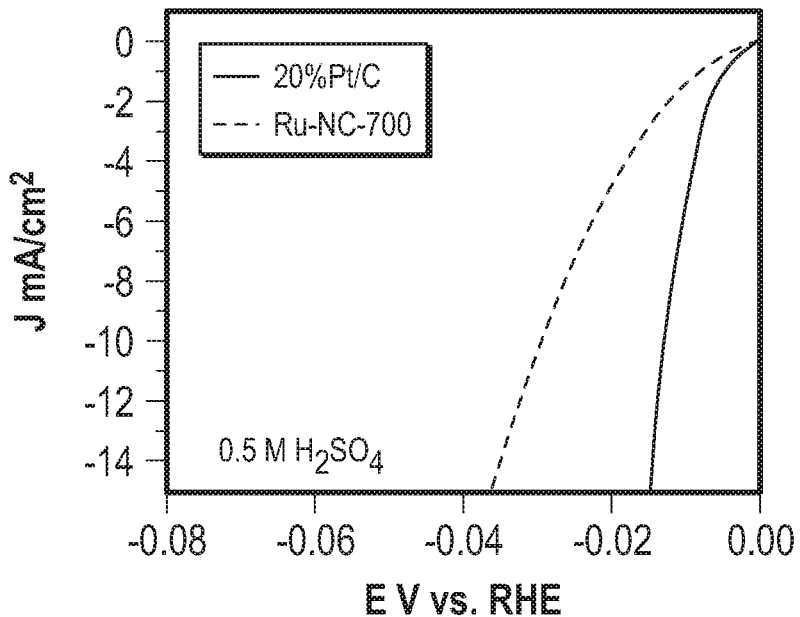
FIG. 44 is a plot of LSV curves of the nanowire of FIG. 18 and 20% Pt/C catalyst in 0.5 M sulfuric acid ($H_2SO_4$)
Figure 45:
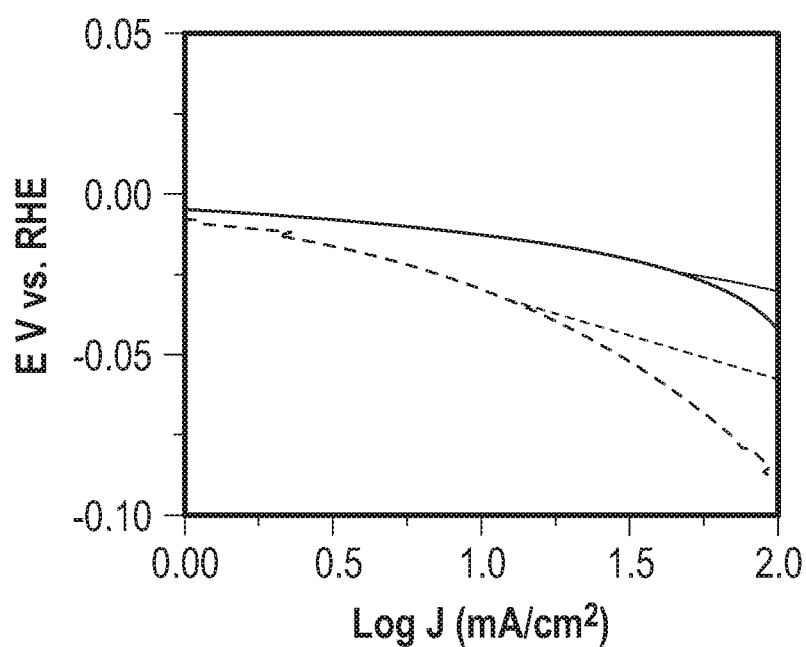
FIG. 45 is a plot of Tafel curves of the nanowire of FIG. 18 and 20% Pt/C catalyst in 0.5 M $H_2SO_4$.

With reference to FIG. 43, which shows LSV curves of Ru—NC-700 and 20% Pt/C in 1 M KOH, the enhancement, as compared to Pt/C, is even more pronounced, with an $\eta_{10}$ of only about −12 mV for Ru—NC-700, which was much better than that (about −49 mV) of Pt/C. It was observed that the Ru—NC-700 sample outperformed other Ru-based HER catalysts in basic media that have been reported in recent studies as summarized in Table 8 below. In addition, Ru—NC-700 also showed a remarkably high HER activity in acid, with a low $\eta_{10}$ of about −29 mV and Tafel slope of about 28 mV/dec in 0.5 M sulfuric acid ($H_2SO_4$), as compared to $\eta_{10}$ of about −13 mV and a Tafel slope of about 18 mV/dec for Pt/C as shown in FIGS. 44 and 45, which show LSV curves for Ru—NC-700 and 20% by weight Pt/C in 0.5 M $H_2SO_4$ and Tafel curves.

Figure 47:
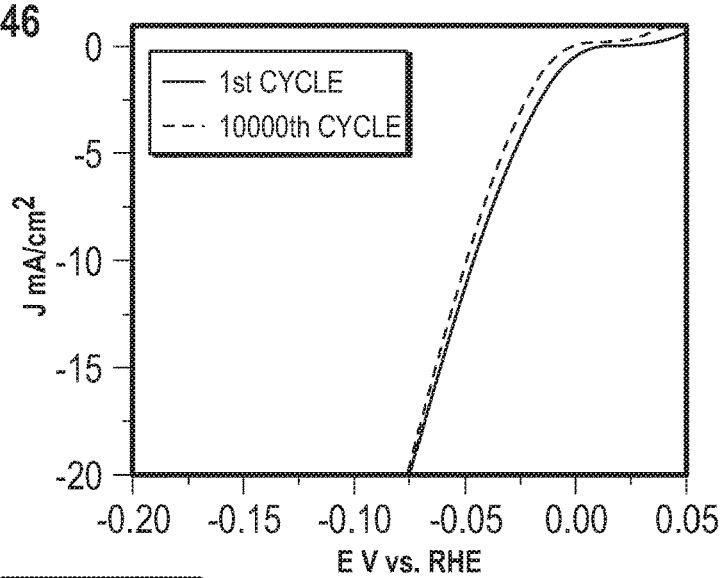
FIG. 47 is a plot of LSV curves of stability tests of the nanowire of FIG. 18 in 0.1 M KOH at 1 first cycle and after 10,000 cycles.

Ru—NC-T and 20% Pt/C in 0.1 M KOH acquired at about −10 mV vs RHE, it was observed that Ru—NC-T and 20% Pt/C exhibited a quasi-semicircle, where the diameter represents the corresponding charge-transfer resistance ($R_{CT}$). With reference to Table 7 above, $R_{CT}$ of Ru—NC-500 (154Ω) and Ru—NC-600 (129Ω) was comparable to that of commercial Pt/C (136Ω), it was significantly lower for Ru—NC-700 (20.7Ω) and Ru—NC-800 (38.6Ω), in good agreement with results from voltammetric measurements as shown in FIG. 44. The Ru—NC-700 catalysts also exhibited remarkable stability as demonstrated in FIG. 47, which showed a plot of LSV curves of stability test of Ru—NC-700 in 0.1 M KOH, at the first cycle and after 10,000 cycles within the potential window of about −0.05 V to about +0.05

| catalyst | catalyst loading (mg/cm$^2$) | Electrolyte solution | $\eta_{10}$ (mV) | Reference |
|---|---|---|---|---|
| Ru—NC-700 nanowires | 0.2 | 0.1M KOH<br>1M KOH | −47<br>−12 | Present application |
| Ru@C$_2$N | 0.285 | 1M KOH | −17 | Mahmood, J. et al. An efficient and pH-universal ruthenium-based catalyst for the hydrogen evolution reaction. *Nat Nanotechnol* 12, 441-446, doi: 10.1038/Nnano.2016.304 (2017) |
| Pt—Ni nanowire | 0.015 | 1M KOH | −50-60 | Pengtang Wang, Xu Zhang, Jin Zhang, Sheng Wan, Shaojun Guo, Gang Lu, Jianlin Yao, Xiaoqing Huang, Precise tuning in platinum-nickel/nickel sulfide interface nanowires for synergistic hydrogen evolution catalysis. *Nat Commun* 8, 14580, DOI: 10.1038/ncomms14580 (2017) |
| Pt—Ni alloy | −0.66 | 0.1M KOH | −65 | Zhenming Cao, Qiaoli Chen, Jiawei Zhang, Huiqi Li, Yaqi Jiang, Shouyu Shen, Gang Fu, Bang-an Lu, Zhaoxiong Xie, Lansun Zheng, Platinum-nickel alloy excavated nano-multipods with hexagonal close-packed structure and superior activity towards hydrogen evolution reaction, *Nat Commun* 8, 15131, DOI: 10.1038/ncomms15131 (2017) |
| Ni$_2$P—Ru | 0.28 | 1M KOH | −31 | Liu, Y. et al. Ru Modulation Effects in the Synthesis of Unique Rod-like Ni@Ni2P—Ru Heterostructures and Their Remarkable Electrocatalytic Hydrogen Evolution Performance. *J Am Chem Soc* 140, 2731-2734, doi: 10.1021/jacs.7b12615 (2018) |
| Ru/C$_3$N$_4$/C | 0.2 | 0.1M KOH | −79 | Zheng, Y. et al. High Electrocatalytic Hydrogen Evolution Activity of an Anomalous Ruthenium Catalyst. *J Am Chem Soc* 138, 16174-16181, doi: 10.1021/jacs.6b11291 (2016) |
| RuP2 | 1 | 1M KOH | −52 | Zheng, Y., Jiao, Y., Qiao, S. & Vasileff, A. Hydrogen Evolution Reaction in Alkaline Solution: From Theory, Single Crystal Models, to Practical Electrocatalysts. *Angewandte Chemie International Edition* 56, 11559-11564 (2017) |
| IrCo@NC | 0.285 | 1M KOH | −45 | Jiang, P. et al. Tuning the Activity of Carbon for Electrocatalytic Hydrogen Evolution via an Iridium-Cobalt Alloy Core Encapsulated in Nitrogen-Doped Carbon Cages. *Adv Mater* 30, doi: ARTN 1705324 |
| RuCo@NC | 0.275 | 1M KOH | −28 | *Nat Commun* 8, 14969 (2017) |

Figure 46:
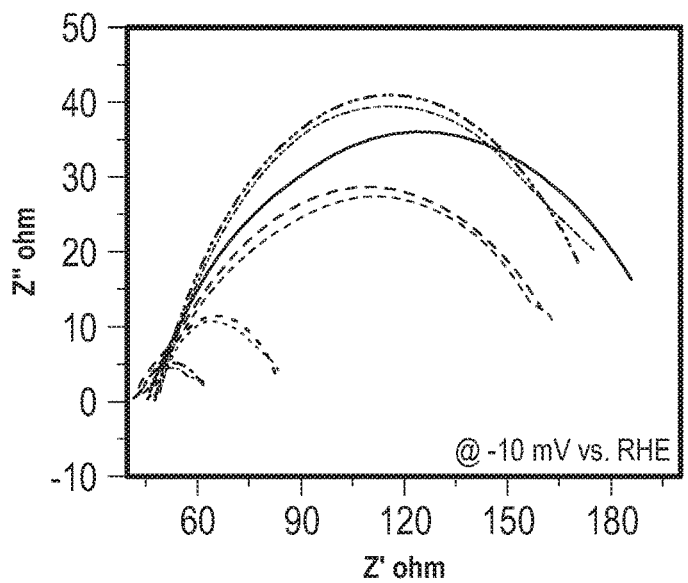
FIG. 46 is a plot of Nyquist curves of the nanowire of FIG. 18 of Ru—NC-T and 20% Pt/C in 0.1 M KOH.

The charge-transfer kinetics involved in HER were also examined using electrochemical impedance measurements. With reference to FIG. 46, which shows Nyquist curves of Ru—NC-T and 20% Pt/C in 0.1 M KOH acquired at about V vs RHE. It was observed that there was virtually no change of the HER polarization curves after 10,000 potential cycles.

Figure 48:
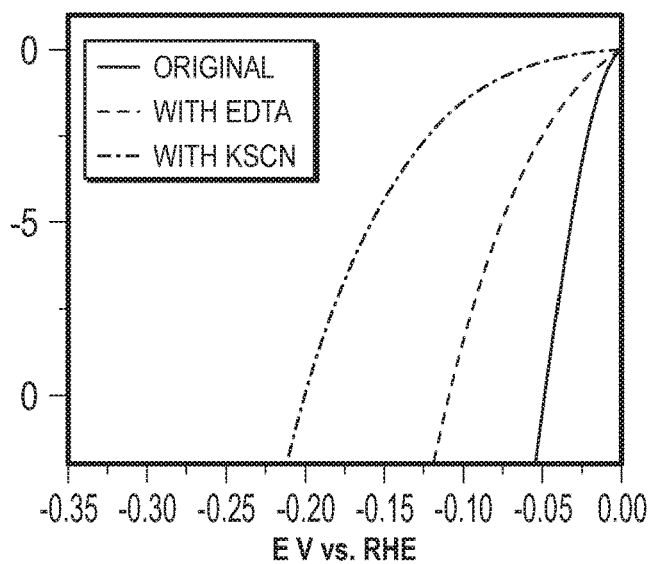
FIG. 48 is a plot of LSV curves of the nanowire of FIG. 18 in 0.1 M KOH, in the presence of ethylenediaminetetraacetic acid (EDTA), and potassium thiocyanate (KSCN)

As both Ru nanoparticles and Ru single atoms were present in the Ru—NC-T samples as shown in FIG. 7, EDTA and KSCN were used as poisoning species to help differentiate their contributions. In addition, a catalyst poisoning experiment was performed on Ru—NC-700 in 0.1 M KOH with the addition of 10 mM of ethylenediaminetetraacetic (EDTA) acid and 10 mM of potassium thiocyanate (KSCN). With reference to FIG. 48, which shows LSV curves for Ru—NC-700 with EDTA (solid curve) and 10 mM of KSCN (dashed curve), it was observed that with the addition of 10 mM KSCN, the $\eta_{10}$ value shifted negatively by more than about 150 mV, and the shift was much smaller (about 60 mV) when 10 mM EDTA was added to the solution. SCN$^-$ was readily adsorbed onto both Ru nanoparticle surfaces and Ru—N/Ru—C sites, and EDTA formed coordination bonds predominantly with the latter. The different poisoning effect observed by SCN$^-$ and EDTA (FIG. 47) suggests that whereas both Ru nanoparticles and Ru—N/Ru—C contributed to the HER activity, the latter likely played a dominant role. This is in sharp contrast with leading results in previous studies where the HER activity was primarily attributed to ruthenium nanoparticles.

Figure 49:
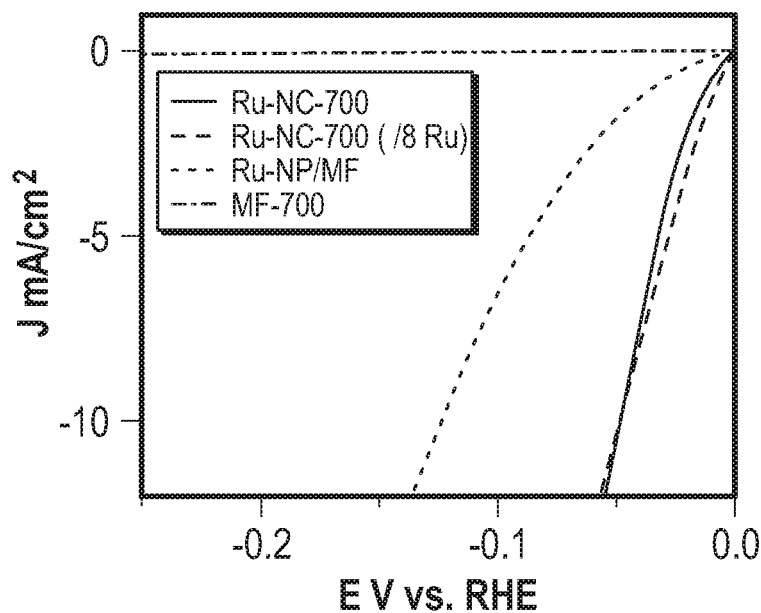
FIG. 49 is a plot of LSV curves of the nanowire of FIG. 18 and three control samples in 0.1 M KOH.

With reference to FIG. 49, which shows LSV curves of Ru—NC-700, a first control Ru—NC-700 (⅛ Ru), a second control Ru NP/MF, and a third control MF-700 at the same loading in 0.1 M KOH, the HER performance of the EDTA-treated Ru—NC-700 sample was very similar to that with ruthenium nanoparticles deposited onto MF nanowires (RuNP/MF, $\eta_{10}$ of about −124 mV). Although in Ru—NC-700 (⅛ Ru) the amount of RuCl$_3$ was reduced to about ⅛, the number of ruthenium nanoparticles in the resulting sample was diminished to about 1/30 of that for Ru—NC-700; yet, the HER performance (e.g., $\eta_{10}$ of about −50 mV) was almost identical to that of Ru—NC-700 as shown in FIG. 49. This illustrates only minimal contributions from ruthenium nanoparticles based on the observed HER activity, and that it is the ruthenium single atoms that dominated the HER performance. This is further supported by the zero activity from the third control sample, MF-700, which lacked any ruthenium. The resulting N-doped carbon nanowires essentially showed zero activity.

In summary, Ru,N-codoped carbon nanowires outperformed commercial Pt/C catalysts towards HER in alkaline media. The performance is ascribed to the formation of RuC$_x$N$_y$ moieties, where the ruthenium centers as well as the C sites likely serve as the HER active centers, with hydrogen binding facilitated by the coordinating nitrogen sites. By contrast, contributions from ruthenium nanoparticles are minor. Results from this study can be exploited for the rational design and engineering of ruthenium-based single atom catalysts towards HER in alkaline media. In addition, this study highlights the significance of structural characterization at the atomic scale in unraveling the mechanistic origin of metal, nitrogen-codoped carbons in electrocatalytic reactions.

It will be appreciated that of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, or material.

What is claimed is:

1. A catalyst nanocomposite comprising:
a substrate; and
a coating disposed on the substrate, the coating having a ruthenium and nitrogen co-doped carbon matrix, wherein ruthenium is present in the carbon matrix as atomic species including Ru coordinated to N and C thereby forming RuC$_2$N$_2$ moieties.

2. The catalyst nanocomposite according to claim 1, wherein the substrate is a nanowire having a length from about 100 nm to about 10,000 nm and a cross section from about 10 nm to about 100 nm.

3. The catalyst nanocomposite according to claim 2, wherein the nanowire is formed using pyrolysis from a metal including at least one of tellurium, copper, silver, gold, iron, silicon, zinc, germanium, antimony, oxides or alloys thereof.

4. The catalyst nanocomposite according to claim 1, wherein the coating is formed using pyrolysis from of a melamine-formaldehyde polymer.

5. The catalyst nanocomposite according to claim 1, wherein ruthenium is further present in the carbon matrix as Ru nanoparticle species.

6. The catalyst nanocomposite according to claim 5, wherein a ratio of the atomic species to the nanoparticle species is from about 0.3 to about 0.5.

7. The catalyst nanocomposite according to claim 5, wherein a ratio of the atomic species to the nanoparticle species is from about 0.35 to about 0.45.

8. A method for forming a catalyst nanocomposite, the method comprising:
forming a coating on a substrate;
reacting the substrate having the coating with a ruthenium halide salt to incorporate ruthenium into the coating; and
pyrolizing the substrate having the coating and the ruthenium to form a ruthenium and nitrogen co-doped carbon matrix, wherein ruthenium is present in the nitrogen co-doped carbon matrix as atomic species including Ru coordinated to N and C thereby forming RuC$_2$N$_2$ moieties.

9. The method according to claim 8, further comprising forming a plurality of nanowires, each of the nanowires acting as the substrate and having a length from about 100 nm to about 10,000 nm and a cross section from about 10 nm to about 100 nm.

10. The method according to claim 9, wherein the plurality of nanowires are formed from a metal including at least one of tellurium, copper, silver, gold, iron, silicon, zinc, germanium, antimony, oxides or alloys thereof.

11. The method according to claim 8, wherein forming the coating includes polymerizing melamine and formaldehyde to form a melamine-formaldehyde polymer.

12. The method according to claim 8, wherein pyrolizing the substrate having the coating and the ruthenium includes heating the substrate having the coating and the ruthenium to a temperature from about 500° C. to about 800° C.

13. The method according to claim 12, wherein ruthenium is present in the carbon matrix as nanoparticle species and atomic species.

14. The method according to claim 13, wherein a ratio of the atomic species to the nanoparticle species is from about 0.3 to about 0.5.

15. The method according to claim 14, wherein a ratio of the atomic species to the nanoparticle species is from about 0.35 to about 0.45.

16. A method for producing hydrogen, the method comprising:

contacting at least one hydrogen-containing compound to a catalyst composition under conditions suitable for dehydrogenating the at least one hydrogen-containing compound to form hydrogen, wherein the catalyst composition includes a substrate having a coating, which includes a ruthenium and nitrogen co-doped carbon matrix, wherein ruthenium is present in the carbon matrix as atomic species including Ru coordinated to N and C thereby forming $RuC_2N_2$ moieties.

17. The method according to claim 16, wherein the substrate is a nanowire having a length from about 100 nm to about 10,000 nm and a cross section from about 10 nm to about 100 nm and the nanowire is metal including at least one of tellurium, copper, silver, gold, iron, silicon, zinc, germanium, antimony, oxides or alloys thereof.

18. The method according to claim 16, wherein the coating is a melamine-formaldehyde polymer.

19. The method according to claim 16, wherein ruthenium is present in the carbon matrix as nanoparticle species and atomic species at a ratio of the atomic species to the nanoparticle species from about 0.3 to about 0.5.

\* \* \* \* \*